(12) United States Patent
Schumann et al.

(10) Patent No.: US 11,687,999 B2
(45) Date of Patent: *Jun. 27, 2023

(54) SYSTEMS AND METHODS FOR RESERVING A REPLACEMENT RENTAL VEHICLE

(71) Applicant: State Farm Mutual Automobile Insurance Company, Bloomington, IL (US)

(72) Inventors: Josh Schumann, Lawrenceville, GA (US); Itobore Odje, Mableton, GA (US); Cagatay Azkin, Suwanee, GA (US); Scott Vermeyen, Atlanta, GA (US); Kevin Lenz, Bloomington, IL (US); Norma Musciotto, Alpharetta, GA (US); Denise Ferguson, Roswell, GA (US); Brian Miller, Palm Springs, CA (US); Chris Sharp, Dunwoody, GA (US); Andrea Foster, Dunwoody, GA (US); Ivan Hall, Bloomington, IL (US); Tracey Herring, Lilburn, GA (US); Steve Stought, Suwanee, GA (US); Sanjay Sen, Marietta, GA (US); Matt Ackers, Bloomington, IL (US); Tarikere Yunus Zareena Parveen, Cumming, GA (US); Michelle Adler, Sugar Hill, GA (US); Eric Brown, Dunwoody, GA (US); Billy Simonovich, Sugar Hill, GA (US); Jose Gonzalez, Snellville, GA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/465,542

(22) Filed: Sep. 2, 2021

(65) Prior Publication Data
US 2021/0398203 A1 Dec. 23, 2021

Related U.S. Application Data

(63) Continuation of application No. 16/026,489, filed on Jul. 3, 2018, now Pat. No. 11,120,497.

(51) Int. Cl.
*G06Q 30/06* (2023.01)
*G06Q 30/0645* (2023.01)
(Continued)

(52) U.S. Cl.
CPC ..... *G06Q 30/0645* (2013.01); *G06Q 30/0283* (2013.01); *G06Q 30/0639* (2013.01); *G06Q 40/08* (2013.01); *G06Q 30/0625* (2013.01)

(58) Field of Classification Search
CPC .......................... G06Q 30/0639; G06Q 40/08
See application file for complete search history.

(56) References Cited

U.S. PATENT DOCUMENTS 8,401,881 B2 3/2013 Weinstock et al.
8,712,806 B1 4/2014 Medina, III et al.
(Continued)

FOREIGN PATENT DOCUMENTS

JP 2001344490 A 12/2001
KR 101721011 B1 3/2017

*Primary Examiner* — Bennett M Sigmond
*Assistant Examiner* — Marla Hudson
(74) *Attorney, Agent, or Firm* — Armstrong Teasdale LLP

(57) ABSTRACT

A rental self-service ("RSS") computer system, including a processor and a memory, is provided. The processor is programmed to: (i) verify that a policyholder is eligible to receive a replacement rental; (ii) transmit a customized link to the eligible policyholder; (iii) receive an access request for access of a rental self-service portal, (iv) retrieve policyholder data using information extracted from the custom-
(Continued)

ized link; (v) pre-populate a portion of a searchable interface of the rental self-service portal using the retrieved policyholder data; (vi) cause rental vehicle data to be displayed to enable the policyholder to view available rental options and select a vehicle class; (vii) calculate a policyholder cost for renting a selected vehicle class; and (viii) cause to be displayed on the user device (a) the calculated policyholder cost and (b) an option to confirm the rental reservation.

18 Claims, 8 Drawing Sheets

(51) Int. Cl.
    *G06Q 30/0283*    (2023.01)
    *G06Q 40/08*       (2012.01)
    *G06Q 30/0601*    (2023.01)

(56) References Cited

U.S. PATENT DOCUMENTS

| | | |
|---|---|---|
| 2002/0116228 A1 | 8/2002 | Bauer et al. |
| 2008/0097798 A1 | 4/2008 | DeVallance et al. |
| 2008/0162199 A1 | 7/2008 | Smith et al. |
| 2008/0215375 A1 | 9/2008 | Nakano et al. |
| 2010/0138242 A1 | 6/2010 | Ferrick et al. |
| 2011/0145019 A1 | 6/2011 | Rehor et al. |
| 2012/0095788 A1 | 4/2012 | Simpson et al. |
| 2012/0232935 A1 | 9/2012 | Voccola |
| 2013/0246104 A1 | 9/2013 | Weinstock et al. |
| 2014/0266594 A1 | 9/2014 | Reiser |
| 2019/0272568 A1 | 9/2019 | Umeda et al. |

FIG. 7A

SYSTEMS AND METHODS FOR RESERVING A REPLACEMENT RENTAL VEHICLE

CROSS-REFERENCE TO RELATED APPLICATIONS

This application is a continuation application of and claims priority to U.S. patent application Ser. No. 16/026,489, filed Jul. 3, 2018, entitled "Systems and Methods for Reserving a Replacement Rental Vehicle", the contents and disclosures of which are hereby incorporated herein by reference in its entirety.

FIELD OF THE DISCLOSURE

The present disclosure relates to reserving a replacement rental vehicle, and more particularly, to a network-based systems and methods for enabling a policyholder of an automobile insurance policy to initiate a rental vehicle reservation.

BACKGROUND

An automobile insurance policyholder may report a loss of vehicle use with the policyholder's insurer when his or her vehicle is not drivable due to damage. For example, vehicle damage may occur due to a vehicular accident or a hit-and-run accident. Most often, a policyholder needs to rent a vehicle while his or her vehicle is being repaired. This may require the policyholder to not only file a claim with their insurer, but also communicate extensively with their claims handler and/or insurance agents to arrange for a replacement vehicle. Oftentimes, policyholders face long claim handling times and confusion during the claims process as policyholders are frequently transferred between different departments. Depending on the circumstances surrounding the reported loss and the policyholder's specific insurance provisions, a policyholder may experience difficulties while trying to secure a rental vehicle. Furthermore, the claims process typically takes some time, and requires extensive communication between the policyholder, the claims handler, the rental vendor, and the repair facility. There exists a need for a policyholder who has filed a loss with their insurer to initiate a rental reservation process on his or her own without having to go through a claims handler.

BRIEF SUMMARY

The present embodiments may relate to systems and methods for reserving a replacement rental vehicle after submission of an initial loss claim submission. The system may include a rental self-service ("RSS") computer system, one or more insurance network computer devices, one or more rental vendor computer devices, and/or one or more repair facility computer devices. The RSS computer system may be associated with an insurance network, or may be separate from an insurance network but be in communication with an insurance network.

The RSS computer system may be configured to: (i) retrieve policyholder insurance data from an insurance provider database using a claim identifier and a policyholder identifier; (ii) verify that the policyholder is eligible to receive an insurance replacement rental by performing a rules-based eligibility check; (iii) cause to be displayed on a user device associated with the policyholder a searchable interface that is configured to enable the policyholder to search for at least one rental vendor location; (iv) receive a selected vehicle class inputted by the policyholder; (v) calculate a policyholder cost for the selected vehicle class; (vi) display a cost summary to the policyholder; and (vii) receive, from the policyholder, confirmation of a rental reservation request.

In one aspect, a rental self-service ("RSS") computer system includes a processor in communication with a memory. The processor is programmed to: (i) verify, in response to an initial loss claim filed by a policyholder, that the policyholder is eligible to receive an insurance replacement rental by performing an eligibility check using a claim identifier associated with the initial loss claim and a policyholder identifier associated with the policyholder; (ii) in response to the policyholder being verified as eligible, transmit, to a user device associated with the policyholder, a customized link including a representation of the claim identifier and the policyholder identifier; (iii) in response to selection of the customized link at the user device, receive, from the user device, an access request for access of a rental self-service portal, the access request identifying the customized link selected by the policyholder; (iv) retrieve, from a database, using the representation of the claim identifier and the policyholder identifier extracted from the customized link identified in the access request, policyholder data; (v) pre-populate a portion of a searchable interface of the rental self-service portal using the retrieved policyholder data, for display on the user device; (vi) in response to receiving rental vehicle search input into the searchable interface, cause rental vehicle data to be displayed on the user device to enable the policyholder to view available rental options and select a vehicle class available for rent; (vii) calculate a policyholder cost for renting a selected vehicle class based upon the policyholder data and a corresponding vehicle rental quote for the selected vehicle class, the policyholder cost including a difference between a covered rental amount indicated in the retrieved policyholder data and a rental cost indicated in the vehicle rental quote; and (viii) cause to be displayed on the user device (a) the calculated policyholder cost and (b) an option to confirm the rental reservation.

In another aspect, a computer-implemented method for enabling a policyholder to initiate a replacement rental reservation after submission of an initial loss claim is provided. The method is implemented on a rental self-service ("RSS") computing device including at least one processor in communication with at least one memory device. The method includes: (i) verifying, in response to an initial loss claim filed by a policyholder, that the policyholder is eligible to receive an insurance replacement rental by performing an eligibility check using a claim identifier associated with the initial loss claim and a policyholder identifier associated with the policyholder; (ii) in response to the policyholder being verified as eligible, transmitting, to a user device associated with the policyholder, a customized link including a representation of the claim identifier and the policyholder identifier; (iii) in response to selection of the customized link at the user device, receiving, from the user device, an access request for access of a rental self-service portal, the access request identifying the customized link selected by the policyholder; (iv) retrieving, from a database, using the representation of the claim identifier and the policyholder identifier extracted from the customized link identified in the access request, policyholder data; (v) pre-populating a portion of a searchable interface of the rental self-service portal using the retrieved policyholder data, for display on the user device; (vi) in response to receiving rental vehicle search input into the searchable interface, causing rental vehicle data to be displayed on the user device to enable the policyholder to view available rental options and select a vehicle class available for rent; (vii) calculating a policyholder cost for renting a selected vehicle class based upon the policyholder data and a corresponding vehicle rental quote for the selected vehicle class, the policyholder cost including a difference between a covered rental amount indicated in the retrieved policyholder data and a rental cost indicated in the vehicle rental quote; and (viii) causing to be displayed on the user device (a) the calculated policyholder cost and (b) an option to confirm the rental reservation.

In a further aspect, a non-transitory computer-readable storage media having computer-executable instructions embodied thereon for enabling a policyholder to initiate a replacement rental reservation is provided. When executed by at least one processor of an RSS computing device, the computer-executable instructions cause the at least one processor to: (i) verify, in response to an initial loss claim filed by a policyholder, that the policyholder is eligible to receive an insurance replacement rental by performing an eligibility check using a claim identifier associated with the initial loss claim and a policyholder identifier associated with the policyholder; (ii) in response to the policyholder being verified as eligible, transmit, to a user device associated with the policyholder, a customized link including a representation of the claim identifier and the policyholder identifier; (iii) in response to selection of the customized link at the user device, receive, from the user device, an access request for access of a rental self-service portal, the access request identifying the customized link selected by the policyholder; (iv) retrieve, from a database, using the representation of the claim identifier and the policyholder identifier extracted from the customized link identified in the access request, policyholder data; (v) pre-populate a portion of a searchable interface of the rental self-service portal using the retrieved policyholder data, for display on the user device; (vi) in response to receiving rental vehicle search input into the searchable interface, cause rental vehicle data to be displayed on the user device to enable the policyholder to view available rental options and select a vehicle class available for rent; (vii) calculate a policyholder cost for renting a selected vehicle class based upon the policyholder data and a corresponding vehicle rental quote for the selected vehicle class, the policyholder cost including a difference between a covered rental amount indicated in the retrieved policyholder data and a rental cost indicated in the vehicle rental quote; and (viii) cause to be displayed on the user device (a) the calculated policyholder cost and (b) an option to confirm the rental reservation.

In one aspect, a rental self-service ("RSS") computer system configured to enable a policyholder of an automobile insurance policy to initiate an insurance replacement rental reservation may be provided. In some exemplary embodiments, the RSS computer system may include a processor in communication with a memory. The processor may be programmed to: (i) retrieve, from an insurance provider database, policyholder insurance data using a claim identifier associated with the initial loss claim submission, and a policyholder identifier associated with the policyholder, the insurance provider database associated with an insurance provider providing the automobile insurance policy to the policyholder; (ii) verify that the policyholder is eligible to receive an insurance replacement rental by performing an eligibility check using the claim identifier and the policyholder identifier, wherein the eligibility check includes applying eligibility rules stored in the memory to determine policyholder eligibility; (iii) cause to be displayed on a user device associated with the policyholder a searchable interface that is prepopulated with at least some of the policyholder insurance data and linked to a subset of rental vehicle data stored within the memory, the searchable interface configured to enable the policyholder to search for at least one rental vendor location of at least one rental vendor applicable to the policyholder; (iv) receive a selected vehicle class inputted by the policyholder via the user device, wherein the selected vehicle class is available for rent at the at least one rental vendor location; (v) calculate, a policyholder cost for the selected vehicle class based upon the policyholder insurance data, the selected vehicle class, and the rental vehicle data for the at least one rental vendor; (vi) display, to the policyholder, a cost summary including the policyholder cost and information as to the calculation of the policyholder cost; and (vii) receive, from the policyholder, confirmation of a rental reservation request of the selected vehicle class at the at least one rental vendor location. The RSS computer system may have additional, less, or alternate functionality, including that discussed elsewhere herein.

In another aspect, a computer-implemented method for enabling a policyholder of an automobile insurance policy to initiate an insurance replacement rental reservation may be provided. The method may be implemented using a rental self-service ("RSS") computing device. The RSS computing device may include at least one processor in communication with at least one memory device. The method may include: (i) retrieving, by the RSS computing device, policyholder insurance data from an insurance provider database using a claim identifier associated with the initial loss claim submission, and a policyholder identifier associated with the policyholder, the insurance provider database associated with an insurance provider providing the automobile insurance policy to the policyholder; (ii) verifying that the policyholder is eligible to receive an insurance replacement rental by performing an eligibility check using the claim identifier and the policyholder identifier, wherein the eligibility check includes applying eligibility rules stored in the memory to determine policyholder eligibility; (iii) causing to be displayed on a user device associated with the policyholder a searchable interface that is prepopulated with at least some of the policyholder insurance data and linked to a subset of rental vehicle data stored within the memory, the searchable interface configured to enable the policyholder to search for at least one rental vendor location of at least one rental vendor applicable to the policyholder; (iv) receiving a selected vehicle class inputted by the policyholder via the user device, wherein the selected vehicle class is available for rent at the at least one rental vendor location; (v) calculating a policyholder cost for the selected vehicle class based upon the policyholder insurance data, the selected vehicle class, and the rental vehicle data for the at least one rental vendor; (vi) displaying, to the policyholder, a cost summary including the policyholder cost and information as to the calculation of the policyholder cost; and (vi) receiving, by the RSS computing device from the policyholder, confirmation of a rental reservation request of the selected vehicle class at the at least one rental vendor location. The method may have additional, less, or alternate functionality, including that discussed elsewhere herein.

In at least one further aspect, a non-transitory computer-readable storage media having computer-executable instructions embodied thereon for enabling a policyholder of an automobile insurance policy to initiate an insurance replacement rental reservation may be provided. When executed by at least one processor of an RSS computing device, the computer-executable instructions may cause the at least one processor to: (i) retrieve, from an insurance provider database, policyholder insurance data using a claim identifier associated with the initial loss claim submission, and a policyholder identifier associated with the policyholder, the insurance provider database associated with an insurance provider providing an automobile insurance policy to the policyholder; (ii) verify that the policyholder is eligible to receive an insurance replacement rental by performing an eligibility check using the claim identifier and the policyholder identifier, wherein the eligibility check includes applying stored eligibility rules to determine policyholder eligibility; (iii) cause to be displayed on a user device associated with the policyholder a searchable interface that is prepopulated with at least some of the policyholder insurance data and linked to a subset of stored rental vehicle data, the searchable interface configured to enable the policyholder to search for at least one rental vendor location of at least one rental vendor applicable to the policyholder; (iv) receive a selected vehicle class inputted by the policyholder via the user device, wherein the selected vehicle class is available for rent at the at least one rental vendor location; (v) calculate, a policyholder cost for the selected vehicle class based upon the policyholder insurance data, the selected vehicle class, and the rental vehicle data for the at least one rental vendor; (vi) display, to the policyholder, a cost summary including the policyholder cost and information as to the calculation of the policyholder cost; and (vii) receive, from the policyholder, confirmation of a rental reservation request of the selected vehicle class at the at least one rental vendor location. The computer-executable instructions may have additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIGS. 7A and 7B illustrate a plurality of views of an exemplary user interface for initiating a rental reservation in accordance with the process shown in FIG. 1, using the system shown in FIG. 3.

Figure 1:
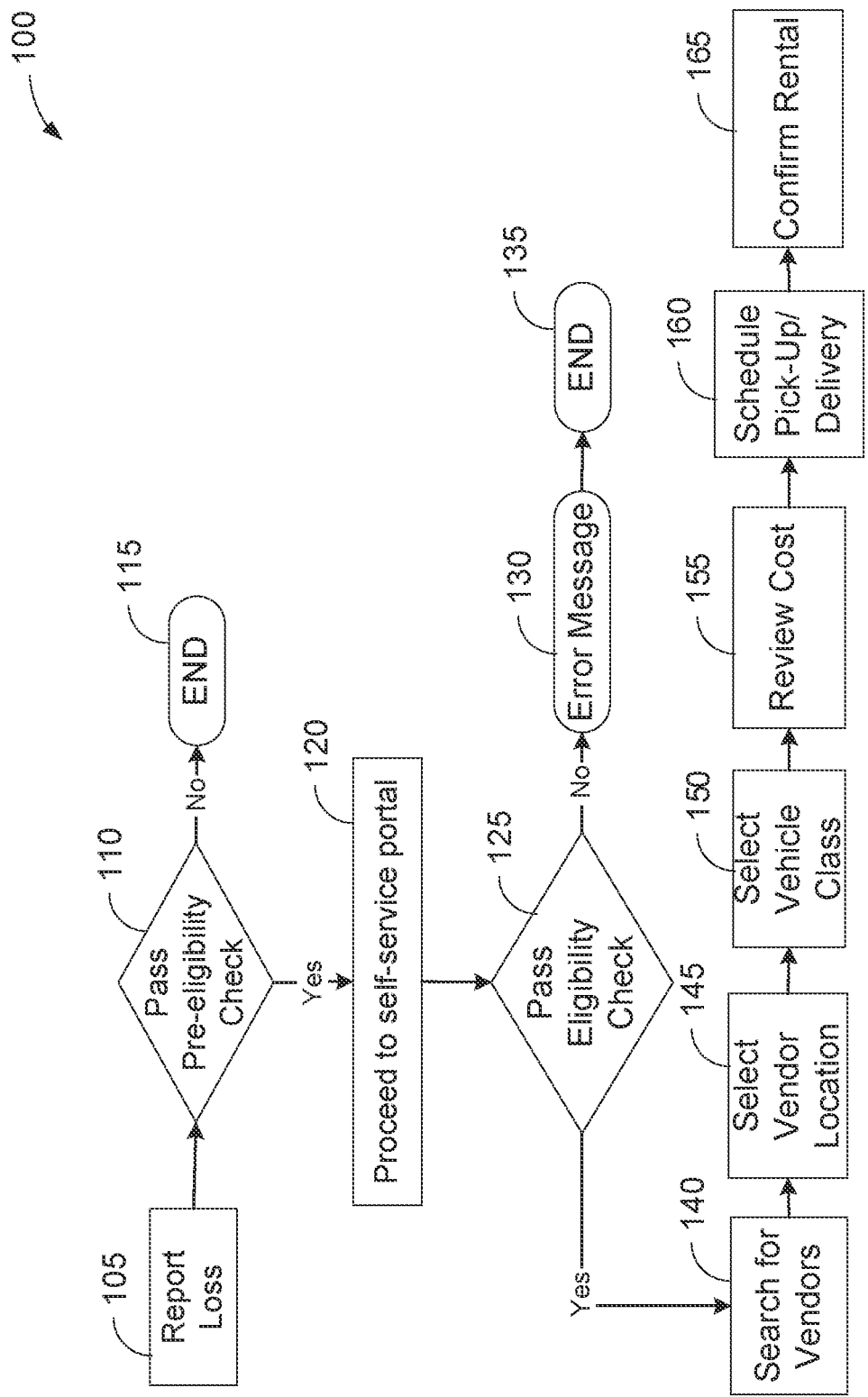
FIG. 1 illustrates a flow chart of an exemplary process of initiating a rental reservation in accordance with one aspect of the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, improved systems and methods for reserving a rental vehicle. The systems and methods described herein overcome the deficiencies of other known systems. In one exemplary embodiment, the process may be performed by a rental self-service ("RSS") computing device. In the exemplary embodiment, the RSS computing device may be in communication with a user computer device (e.g., a mobile computer device), an insurance network, one or more rental vendors, and one or more repair facilities.

In the exemplary embodiment, the RSS computing device may retrieve policyholder insurance data from an insurance network using a claim identifier associated with an initial loss claim submission, and a policyholder identifier associated with the policyholder. More specifically, the RSS computing device retrieves policyholder insurance data specific to an automobile insurance policy held by the policyholder who reports a loss (e.g., files an initial loss claim). In the exemplary embodiment, the claim identifier may be associated with an initial loss claim submission (e.g., first notice of loss) filed by the policyholder. The claim identifier may be a claim number generated by the RSS computing device or another insurance network computing device when the policyholder files a first notice of loss (e.g., FNOL). The policyholder identifier may be a policy number or other policy identifier associated with the policyholder. In the exemplary embodiment, the policyholder may provide the policyholder identifier when filing the FNOL. The policyholder identifier and the claim identifier may be used to retrieve the policyholder's automobile insurance policy as of the date and time the claim identifier is generated. In the exemplary embodiment, the RSS computing device uses the claim identifier and the policyholder identifier to retrieve the policyholder's rental coverage as of the date the claim identifier is generated.

In the exemplary embodiment, the RSS computing device may extract the policyholder identifier and claim identifier from a customized link generated by the RSS computing device during a pre-eligibility process. In the exemplary embodiment, the RSS computing device may generate and transmit a customized link to a policyholder who passes a pre-eligibility check (e.g., a first check). In the exemplary embodiment, the pre-eligibility check may be performed using the information provided by the policyholder in the FNOL. The customized link generated by the RSS computing device provides access to a self-service portal that enables the policyholder to initiate a rental vehicle reservation. When the policyholder proceeds with the self-service rental process via the customized link, the RSS computing device may utilize the claim identifier parameter and the policyholder identifier parameter of the customized link to retrieve the policyholder insurance data (e.g., rental coverage) from the insurance network. In some embodiments, an insurance network computing device in communication with the RSS computing device may perform the pre-eligibility check using the information provided by the policyholder in the FNOL. In these embodiments, the insurance network computing device may generate the customized link.

In the exemplary embodiment, the RSS computing device retrieves the policyholder's rental coverage as of the date of the reported loss, and displays this information to the policyholder. The policyholder may review the displayed rental coverage. In the exemplary embodiment, daily rental coverage and total rental coverage may be provided to the policyholder. The policyholder may confirm that he or she understands their rental coverage and wishes to proceed with the self-service rental process. In the exemplary embodiment, the RSS computing device receives confirmation from the policyholder, and subsequently performs an eligibility check (e.g., a second check) to verify that the policyholder remains eligible. The RSS computing device may perform the eligibility check by determining that a pay code (e.g., cause of loss) for the initial loss claim submission (e.g., FNOL) exists (e.g., is open). In the exemplary embodiment, the RSS computing device may communicate with an accounting system of the insurer to verify that a rental pay code is open for the reported loss. In the exemplary embodiment, the rental pay code enables the insurer to directly make payments to a rental vendor. The RSS computing device may use the claim identifier and the policyholder identifier to verify that a pay code is open. In some embodiments, the RSS computing device may also apply a set of eligibility rules to the information provided by the policyholder in the FNOL. The eligibility rules may be similar to the rules applied by the RSS computing device during the pre-eligibility check.

In the exemplary embodiment, the RSS computing device may provide a searchable interface to the policyholder. More specifically, a searchable interface is provided by the RSS computing device, causing the searchable interface to be displayed to a policyholder (on a policyholder computing device) who remains eligible to proceed with the self-service rental process. In the exemplary embodiment, the RSS computing device enables the policyholder to search for rental vendor locations. In some embodiments, the RSS computing device may enable the policyholder to select a rental vendor from a list of vendors who have partnered with the insurer. In the exemplary embodiment, the RSS computing device enables the policyholder to customize the search based on geographical location, zip code, and address (e.g., repair facility address). In these embodiments, the RSS computing device may display, to the policyholder, available rental vendor location near a selected repair facility. In these embodiments, the RSS computing device may retrieve, from the insurance network, repair facility information provided by the policyholder during the initial loss claim submission process.

In the exemplary embodiment, the RSS computing device receives a selected rental vendor location of a selected rental vendor. The RSS computing device may further receive, from the policyholder, a selected vehicle class available for rent at the selected rental vendor location. In the example embodiment, the policyholder may select a vehicle class (e.g., sedan, SUV, truck, van). In some embodiments, the RSS computing device may allow the policyholder to select a specific make and/or model of an available rental vehicle at the selected rental vendor location. In other embodiments, the RSS computing device may prompt the policyholder to contact the selected rental vendor location to inquire about available rental vehicles for a selected vehicle class. In certain embodiments, the policyholder may not select a vehicle class.

In the exemplary embodiment, the RSS computing device may calculate a policyholder cost (e.g., estimated cost) for a selected vehicle class. The policyholder cost may be an hourly, daily, weekly, and/or monthly estimated cost for the selected vehicle class. The calculation may be based upon a comparison of a quoted rental cost and coverage provisions of the policyholder's automobile insurance policy (e.g., rental coverage). The RSS computing device may provide the calculations to the policyholder to assist the policyholder in selecting a replacement rental vehicle. For example, a policyholder who has a $50 per day rental coverage may select a sedan that costs $21 per day, and costs $8 per day in taxes and fees. In this example, the RSS computing device may provide a summary of the estimated daily cost ($29), and notify the policyholder that the selected vehicle class is covered under the policyholder's rental coverage. In this example, the policyholder may review a summary of the policyholder cost (e.g., estimated daily cost) and decide to rent a more expensive vehicle covered under the rental policy. In another example, the same policyholder may select a van that costs $35 per day to rent, costs $10 per day in taxes and fees, and an additional $10 in additional add-on items selected by the policyholder. The RSS computing device may alert the policyholder that the policyholder cost exceeds the policyholder's daily rental coverage. In some embodiments, the RSS computing device may output a rental recommendation (e.g., a best rental option) for the policyholder based on the calculations. The policyholder may utilize the calculations and the rental recommendations to select a rental vehicle that is covered under the policyholder's coverage, and meets the policyholder's rental vehicle needs.

In further embodiments, the RSS computing device may provide, to the policyholder, a delivery option. The delivery option may enable the policyholder to schedule at least one of a vehicle pick-up at the selected rental vendor location, and a vehicle delivery, by the selected rental vendor location, to the policyholder. In some embodiments, the policyholder may elect to have the rental vehicle delivered to a designated repair facility. In further embodiments, the RSS computing device may recommend vehicle delivery to a designated repair facility. In these embodiments, the policyholder's designated repair facility and repair facility information may be automatically retrieved from the policyholder's claim file.

In the exemplary embodiment, the RSS computing device may receive, from the policyholder, confirmation of a rental reservation request for a selected vehicle class at the selected rental vendor location. In other embodiments, the RSS computing device may additionally receive, from the policyholder, confirmation of a vehicle delivery option (e.g., vehicle pick-up or vehicle delivery), scheduling information, and repair facility information. In some embodiments, the RSS computing device may receive confirmation of only a selected rental vendor location. In these embodiments, the policyholder may not have selected a vehicle class. In further embodiments, the RSS computing device may transmit the rental reservation request and claim information of the policyholder to the selected vendor location.

Subsequent to receiving confirmation, the RSS computing device may provide, to the policyholder confirmation information, such as a summary of the selected rental vendor location, selected vehicle class, scheduling information, and policyholder cost. In the exemplary embodiment, the RSS computing device may provide, to the policyholder, instructions on how to proceed. In further embodiments, the RSS computing device may transmit the rental reservation information and claim information, such as the claim identifier to the selected vendor location. In other embodiments, the RSS computing device may update the policyholder's claim file to include the rental reservation request. The policyholder's claim file may contain information related to the initial loss claim submission. In further embodiments, the RSS computing device may also generate a file note for a claims handler. In these embodiments, the generated file note may be a message in the policyholder's claim file notifying the claims handler of the rental reservation request.

Exemplary technical effects of the systems, methods, and computer-readable media described herein may include, for example: (i) improving efficiency by eliminating the need for an eligible policyholder to reserve a rental vehicle through a claims handler; (ii) improving the claims process by eliminating the need for the policyholder to repeatedly provide the same information found in the initial claim loss; (iii) improving wait time by eliminating excessive hold times, call transfers, and multiple contacts; (iv) reducing the chance for possible confusion and miscommunication by allowing the policyholder, instead of the insurer, to initiate rental reservation, and schedule a vehicle pick-up or a vehicle delivery; (v) promoting convenience by enabling eligible policyholders to reserve a rental vehicle whenever they want to via a customized link provided by the RSS computing device; (vi) providing eligible policyholders an alternative method to review their rental coverage; (vii) enabling policyholders to better understand their rental vehicle options and daily rental costs prior to obtaining a rental vehicle; (viii) providing a rules-based pre-eligibility check to determine whether a policyholder is eligible to receive a self-service link to access a self-service portal; (ix) generating a customized link for directing an eligible policyholder to a self-service portal that, without additional input from the policyholder, provides rental coverage information as of the date of the reported loss; (x) providing a rules-based eligibility check upon accessing the self-service portal to verify that a policyholder remains eligible; (xi) automatically retrieving policyholder information (e.g., rental coverage, initial loss report, designated repair facility) from a database to facilitate the rental reservation process; (xii) calculating a daily rental cost estimate for a policyholder reserving a rental vehicle through the self-service portal by comparing a policyholder's daily rental coverage to quoted rental costs for available rental vehicles; (xiii) enabling a policyholder who is accessing the self-service portal to select and/or remove add-on items that are not covered by the policyholder's rental coverage; (xiv) enabling a policyholder who is accessing the self-service portal to schedule delivery of a selected rental vehicle to a designated location on a specific date and time; and (xv) providing a rental vehicle recommendation based on the policyholder's daily coverage and rental preferences to a policyholder accessing the self-service portal.

Exemplary Process for Initiating an Insurance Replacement Rental Reservation

FIG. 1 illustrates a flow chart of an exemplary process 100 of enabling a policyholder to initiate an insurance replacement rental reservation, in accordance with the present disclosure. In the exemplary embodiment, process 100 is performed by a computer device associated with an insurance provider. In other embodiments, process 100 is performed by a computer device in communication with an insurance provider.

In the exemplary embodiment, a computer device associated with an insurance provider, such as a rental self-service ("RSS") computing device 310 (shown in FIG. 3), enables a policyholder (not shown) of the insurance provider to report 105 a loss. The policyholder may report 105 the loss by filing an initial loss claim. In the exemplary embodiment, the policyholder utilizes a computer device, such as a mobile computer device, to report 105 the loss. In some embodiments, the policyholder may report 105 the loss by calling their automobile insurance provider via a mobile device. In the exemplary embodiment, the policyholder may utilize an application or website, associated with an insurance provider to report 105 the loss. The loss may be damage to a vehicle due to a vehicular accident (e.g., collision) or a hit-and-run. In other examples, damage may be due to random chance or Mother Nature, such as hail damage or damage from a falling tree limb.

In the exemplary embodiment, RSS computing device 310 (shown in FIG. 3) receives, from the policyholder, identification information such as a policy number, a name of the policyholder (e.g., named insured), or both. RSS computing device 310 also receives information about the loss from the policyholder. This information may include, but is not limited to, the make and model of the vehicle, the circumstances surrounding damage, and details concerning the current condition of the vehicle. The vehicle condition details provided may include, but are not limited to, the extent of damage to the vehicle, and any leaking fluids. In the exemplary embodiment, RSS computing device 310 receives, from the policyholder, an indication as to whether the policyholder plans to obtain a rental vehicle. In some embodiments, RSS computing device 310 may also receive information as to whether the policyholder plans to repair the vehicle. In these embodiments, the policyholder may provide, to RSS computing device 310, repair facility information of a designated or selected repair facility he or she plans to have the vehicle repair.

In the exemplary embodiment, RSS computing device 310 is configured to determine if the policyholder passes 110 a pre-eligibility check. The pre-eligibility check may be a rules-based check. Rules may be stored in a database, and applied to policyholder information inputted by the policyholder (e.g., information provided in the initial loss report) along with the policyholder's profile stored within the database (e.g., policyholder's automobile insurance policy, accident history, claims history). RSS computing device 310 performs a pre-eligibility check (e.g., a first check) to determine if the policyholder is eligible to obtain a rental vehicle under the policyholder's automobile insurance policy. RSS computing device 310 may determine eligibility by applying a set of eligibility rules to the information provided by the policyholder. RSS computing device 310 may utilize models, algorithms, and/or formulas stored within a database to determine eligibility based on the specific circumstances surrounding the policyholder's reported loss. For example, vehicular damage due to the insured's negligence may be assessed differently than vehicular damage due to hail. Eligibility may additionally be based on a variety of factors such as (i) state laws governing the policyholder's automobile insurance provisions, (ii) whether the policyholder has rental reimbursement coverage (e.g., rental car coverage), (iii) whether the reported loss is of the type covered under the policyholder's rental reimbursement coverage, (iv) whether a specific provision in the policyholder's insurance policy covers rental vehicles, (v) whether, in a vehicular accident, the other driver is at fault; and (vi) if in a vehicular accident, whether the at-fault driver's property damage coverage will pay for the policyholder's rental vehicle. The policyholder may need to meet one, some, or all of the eligibility rules in order to proceed and reserve a rental vehicle on his or her own. In some embodiments, the policyholder may immediately be notified of the results of the pre-eligibility check. In other embodiments, there may be a wait time from when the policyholder reports 105 a loss (e.g., files an initial claim loss) to when the policyholder is notified of the results of the pre-eligibility check. In these embodiments, the wait time may be due to additional information required by RSS computing device 310 from the policyholder.

If the policyholder does not pass 110 the pre-eligibility check, the policyholder is ineligible to initiate a rental vehicle reservation on his or her own, and the self-service vehicle rental process comes to an end 115. In the exemplary embodiment, if the policyholder passes 110 the pre-eligibility check, RSS computing device 310 enables the policyholder to proceed 120 to a self-service portal. The self-service portal may be an application, website, or webpage that provides the policyholder with continuing steps for placing a replacement rental reservation. In some embodiments, the self-service portal may be a separate application or website from the one utilized by the policyholder to report 105 the loss. In other embodiments, the self-service portal may be the same application or website as the one utilized by the policyholder to report 105 the loss. In these embodiments, an ineligible policyholder may be denied further access of the application or website. In the exemplary embodiment and in the case where the policyholder passes 110 the pre-eligibility check, RSS computing device 310 causes the policyholder's computing device to display and execute the self-service portal. As explained below, the policyholder accesses the self-service portal by executing a customized link that is generated by the RSS computing device.

In the exemplary embodiment, RSS computing device 310 generates customized links associated with the self-service portal. Each customized link connects a specific policyholder to his or her policyholder profile (e.g., information as to the policyholder's automobile insurance policy, accident history, claims history) stored within a database of RSS computing device 310 such as database 320 (shown in FIG. 3). When a policyholder who passes 110 the pre-eligibility check accesses the customized link on his or her user device, RSS computing device 310 prepopulates policyholder insurance data on a user device associated with the policyholder. Policyholder insurance data may include the policyholder's automobile insurance policy provisions and claim information (e.g., information associated with the policyholder's claim file and initial loss report). RSS computing device 310 may transmit a message (e.g., e-mail, text) to the policyholder that includes the customized link such that the policyholder may proceed 120 to the self-service portal at a later time. In some embodiments, RSS computing device 310 may generate and transmit the customized link to policyholders who pass 110 the pre-eligibility check. For example, the policyholder might not consider obtaining a rental vehicle at the time of reporting 105 a loss, but later decides that he or she wants to rent a vehicle. In other embodiments, RSS computing device 310 may transmit a customized link to a policyholder who has not indicated a desire to obtain a rental vehicle, but plans to repair their vehicle.

In the exemplary embodiment, RSS computing device 310 generates a customized link for the policyholder such that, when accessed by the policyholder, the policyholder's insurance information and claim information will automatically populate without input from the policyholder. In the exemplary embodiment, the customized link contains a policyholder identifier (e.g., policy number) and a claim identifier (e.g., claim number) associated with the reported 105 loss. RSS computing device 310 may extract the policyholder identifier and the claim identifier from the customized link, retrieve the policyholder's insurance and claim information from the insurance network using the extracted identifiers, and load the self-service portal.

In the exemplary embodiment, RSS computing device 310 causes the self-service portal to display the policyholder's auto insurance policy information. The self-service portal may display the policyholder's coverage provisions, such as rental reimbursement coverage (e.g., rental coverage). In the exemplary embodiment, the policyholder's coverage as of the date and time of the filed claim (e.g., reported 105 loss) are retrieved and displayed. In some embodiments, the self-service portal may also provide an explanation of the policyholder's rental coverage. In the exemplary embodiment, RSS computing device 310 also causes the self-service portal to provide an explanation of the rental process to the policyholder. RSS computing device 310 is also configured to enable the policyholder to confirm that he or she is interested in obtaining a rental. In some embodiments, RSS computing device 310 may cause the self-service portal to display a confirmation button (e.g., an "I understand" button). In these embodiments, the policyholder clicks the confirmation button to confirm that he or she understands the insurance coverage provisions, and is interested in proceeding with the rental reservation.

In the exemplary embodiment, RSS computing device 310 is configured to determine if the policyholder passes 125 another rules-based check (e.g., an eligibility check). RSS computing device 310 performs the eligibility check (e.g., a second rules-based check) to verify that the policyholder remains eligible for rental vehicle services under the policyholder's automobile insurance policy. For example, the policyholder may report 105 a loss and pass 110 the pre-eligibility check, but delay in initiating a rental reservation due to circumstances surrounding the loss (e.g., extensive communications between the policyholder's insurance provider and an at-fault driver's insurance provider) or simply due to the policyholder's busy schedule. In another example, a policyholder who had no intentions of obtaining a replacement rental at the time of the pre-eligibility check, may later decide to rent a vehicle. Thus, in the above examples, a time period may elapse from when the policyholder reports 105 the loss (e.g., files an initial loss claim) to when the policyholder proceeds 120 to the self-service portal.

In the exemplary embodiment, RSS computing device 310 performs the eligibility check by determining if a pay code (e.g., cause of loss) associated with the initial loss claim submission (e.g., reported 105 loss) exists. RSS computing device 310 may determine if a pay code specific to rentals and/or vehicle rentals exists (e.g., is open) for the reported 105 loss. In the exemplary embodiment, a pay code for the reported 105 loss enables the insurer to make a payment directly to a rental vendor. RSS computing device 310 may be in communication with a claims accounting system of the insurer. In some embodiments, RSS computing device 310 may be in communication with a financial system of the insurer to determine if the insurer is authorized to pay the claim (e.g., pay for a rental vehicle). In the exemplary embodiment, RSS computing device 310 reads the policyholder identifier and claim identifier parameters from the customized link to retrieve the policyholder's automobile insurance policy and the reported loss (e.g., initial loss claim submission). RSS computing device 310 may utilize the retrieved policyholder and claim information to communicate with other insurer computing devices, and determine if a pay code exists for the reported loss. RSS computing device 310 may perform the eligibility check without additional input from the policyholder.

If a pay code for the initial loss claim submission does not exist (e.g., is not open), the insurer is unable to pay for the claim. A pay code may not exist because of changes to the initial loss claim submission and/or changes to the policyholder's insurance coverage. For example, the initial loss claim submission may be updated to reflect new information that disqualifies the policyholder from renting a vehicle under his or her existing insurance coverage. In some embodiments, if a pay code (e.g., cause of loss) associated with a rental vehicle does not exist, RSS computing device 310 may systematically open a pay code for the reported 105 loss, and request confirmation from a financial system of the insurer. In these embodiments, if RSS computing device 310 receives a response from the financial system confirming that the pay code should be open, RSS computing device 310 may determine that the policyholder passes 125 the eligibility check. In these embodiments, if RSS computing device receives a response from the financial system denying the pay code (e.g., pay code should not be open), the RSS computing device 310 may determine that the policyholder does not pass 125 the eligibility check.

In some embodiments, RSS computing device 310 may also apply a set of eligibility rules in addition to determining if a pay code (e.g., cause of loss) exists. Similar to the pre-eligibility check, RSS computing device 310 may utilize models, algorithms, and/or formulas to verify eligibility based on the information provided in the policyholder's initial loss claim submission (e.g., reported 105 loss). The eligibility rules applied to the initial loss claim submission may include the same rules as the rules used in the pre-eligibility check. In some embodiments, the eligibility rules may be different from the rules used in the pre-eligibility check. The eligibility rules may be based on factors including (i) state laws governing the policyholder's automobile insurance coverage, (ii) whether the policyholder has rental reimbursement coverage (e.g., rental car coverage), (iii) whether the scope of the policyholder's rental reimbursement coverage has changed since the pre-eligibility check, (iv) whether the reported loss has been updated, and (v) whether the reported loss as of the date of the eligibility check is covered under the policyholder's rental reimbursement coverage. The policyholder may need to meet one, some, or all of the eligibility rules in order to proceed and reserve a rental vehicle on his or her own.

In the exemplary embodiment, RSS computing device 310 may generate an error message 130 if the policyholder does not pass 125 the eligibility check. The error message 130 may be displayed to the policyholder after he or she confirms interest in obtaining a rental vehicle. For example, upon clicking a confirmation button (e.g., an "I understand" button), the policyholder may receive an error message 130 that directs the policyholder to contact his or her claims handler. At this point, the policyholder is ineligible to proceed with making a rental vehicle reservation on his or her own, and the self-service vehicle rental process comes to an end 135.

If RSS computing device 310 determines that the policyholder passes 125 the eligibility check, the RSS computing device 310 may provide the policyholder the ability to search 140 for rental vendors. RSS computing device 310 may provide a list of rental vendors from which the policyholder may choose from. The list of rental vendors may be stored within a database associated with RSS computing device 310 such as database 320 (shown in FIG. 3). Additionally, RSS computing device 310 may also enable the policyholder to search for a vendor location. In the exemplary embodiment, RSS computing device 310 provides the policyholder with search options, including geographical location, zip code, and address (e.g., repair facility address), that enable the policyholder to customize the search. In some embodiments, RSS computing device 310 may provide a primary rental vendor for a designated geographical location. In these embodiments, the policyholder may search for locations of the primary rental vendor using the search options mentioned above.

In the exemplary embodiment, RSS computing device 310 returns a list of vendor locations based on the search. The policyholder may select 145 a vendor location from the list. RSS computing device 310 may also enable the policyholder to select 150 a vehicle class (e.g., sedan, SUV, truck, van). In some embodiments, selecting 150 a vehicle class may prompt RSS computing device 310 to display available rental vehicles for the selected vehicle class at the selected rental vendor location. In these embodiments, RSS computing device 310 may allow the policyholder to select a specific make and/or model of a rental vehicle available at the selected rental vendor location. RSS computing device 310 may retrieve available rental vehicle information through Application Programming Interface (API) calls to the selected rental vendor and/or the selected rental vendor locations. The selected rental vendor and/or the selected rental vendor locations may be similar to rental vendor computing devices 330 (shown in FIG. 3). In other embodiments, selecting 150 a vehicle class may prompt RSS computing device 310 to display selected vendor location information (e.g., phone number). In these embodiments, RSS computing device 310 may instruct the policyholder to call the selected vendor location for information on available rental vehicles for the selected vehicle class at the selected vendor location.

In certain embodiments, RSS computing device 310 may enable the policyholder to first select 150 a vehicle class, and then subsequently search 140 for rental vendors and/or rental vendor locations that have the selected vehicle class in stock. In these embodiments, the policyholder may search 140 for rental vendors and/or rental vendor locations carrying the selected vehicle class based on geographical location, zip code, and address. For example, RSS computing device 310 may return a list of rental vendor locations within the policyholder's inputted zip code currently have the selected vehicle class in stock. The policyholder may select 145 a rental vendor location based on rental vehicle availability of the policyholder's selected vehicle class.

In the exemplary embodiment, RSS computing device 310 is configured to enable the policyholder to review 155 a cost (e.g., policyholder cost). RSS computing device 310 may provide, to the policyholder, a quote from the selected vendor location, such as an estimated daily cost to rent a vehicle. In some embodiments, the quoted rental cost may reflect an estimated cost to rent a selected vehicle class. RSS computing device 310 may query computing devices of the selected rental vendor and/or the selected rental vendor location through API calls to retrieve quotes for available vehicle classes and for additional features and/or services. In certain embodiments, the policyholder may not have selected a vehicle class. In these embodiments, RSS computing device 310 may provide, to the policyholder, quotes for a variety of vehicle classes for the policyholder to consider. RSS computing device 310 may also compare the quoted daily rental cost to the policyholder's benefit under their automobile insurance policy. In the exemplary embodiment, RSS computing device 310 may calculate a policyholder cost based on the comparison, and display the policyholder cost to the policyholder. In some embodiments, the calculation of the policyholder cost may include taxes and fees. For example, a policyholder who has a $25 per day coverage may select a sedan that costs $21 per day, but costs $8 per day in taxes and fees. In this example, RSS computing device 310 may calculate and provide to the policyholder, a policyholder cost of $29 and indicate that the policyholder cost is over the policyholder's daily coverage limit. In other embodiments, the calculation may reflect additional charges not covered by the policyholder's automobile insurance policy. For example, the policyholder may select add-on items that are out-of-pocket expenses of which the policyholder may or may not be aware of RSS computing device 310 may be configured to provide to the policyholder a summary of the policyholder cost that provides details of out-of-pocket expenses. In some embodiments, RSS computing device 310 may be configured to provide a rental vehicle recommendation based on the policyholder's daily coverage and vehicle class preference. In these embodiments, the policyholder cost of the recommended rental vehicle calculated by RSS computing device 310 is within the policyholder's daily coverage limit.

In the exemplary embodiment, RSS computing device 310 enables the policyholder to schedule 160 vehicle pick-up or vehicle delivery. RSS computing device 310 may instruct the policyholder to select vehicle pick-up or vehicle delivery. In the exemplary embodiment, RSS computing device 310 may further prompt the policyholder to designate a specific date and time for vehicle pick-up or vehicle delivery. In some embodiments, RSS computing device 310 may provide a list of date and time options for the policyholder to choose from. In certain embodiments, vehicle delivery may be associated with an additional fee (e.g., delivery fee). In these embodiments, RSS computing device 310 may notify the policyholder of the additional fee associated with the vehicle delivery service. The policyholder may choose to schedule vehicle delivery to a repair facility. In some embodiments, RSS computing device 310 may recommend vehicle delivery to a designated repair facility. In these embodiments, the policyholder may have already selected the designated repair facility, such as when inputting information about the loss in step 105. In these embodiments, RSS computing device 310 may be in communication with the designated repair facility to determine vehicle delivery information such as the date and time that repairs are supposed to begin. In some embodiments, RSS computing device 310 may be in communication with the designated repair facility via API calls.

In the exemplary embodiment, RSS computing device 310 may enable the policyholder to confirm 165 the rental. RSS computing device 310 may enable the policyholder to modify the rental reservation at any point in the self-service process prior to receiving rental reservation confirmation from the policyholder. After receiving confirmation, RSS computing device 310 may provide confirmation information such as selected rental vendor location information (e.g., business address, business hours, contact number), a confirmation number, and instructions on how to proceed. In further embodiments, RSS computing device 310 may provide information as to the selected vehicle class, a policyholder cost associated with the selected class, repair facility information, and scheduling information (e.g., vehicle delivery date and time window). Subsequent to receiving confirmation from the policyholder, RSS computing device 310 may transmit the rental reservation information and claim information, such as the claim identifier to the selected vendor location. Once the selected vendor location receives the necessary information from RSS computing device 310, the selected vendor location may contact the policyholder to confirm receipt of the rental reservation request. In some embodiments, RSS computing device 310 may enable the policyholder to modify (e.g., update) a rental reservation after the policyholder confirms 165 the rental. In these embodiments, RSS computing device 310 may require the policyholder to confirm 165 the updated rental reservation. In these embodiments, RSS computing device 310 may subsequently transmit the updated rental reservation to the selected vendor location.

Figure 2:
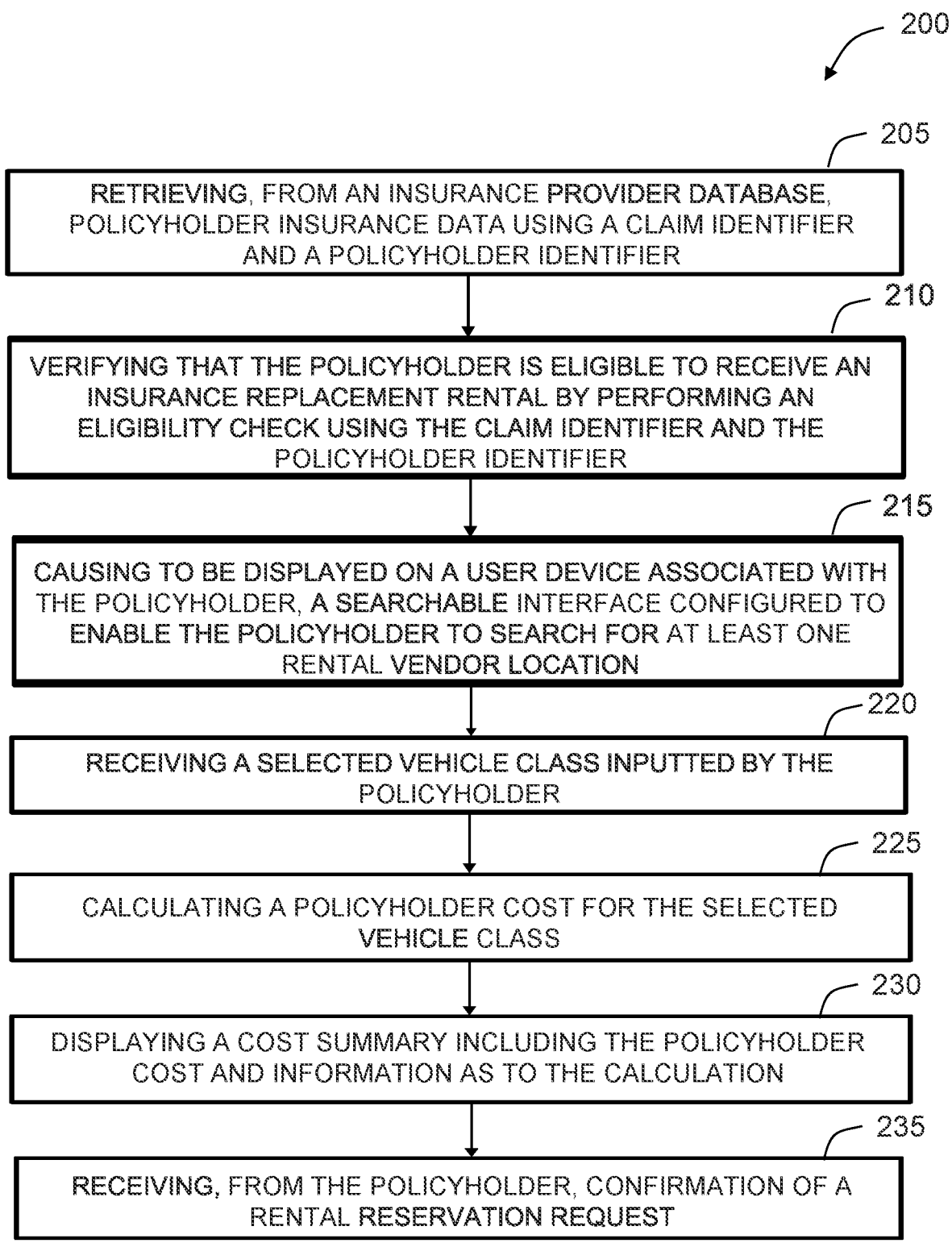
FIG. 2 illustrates a flow chart of an exemplary computer-implemented process for one aspect of the process of initiating a rental reservation as shown in FIG. 1, in accordance with one aspect of the present disclosure.

Exemplary Computer-Implemented Method for Initiating an Insurance Replacement Rental Reservation FIG. 2 illustrates a flow chart of an exemplary computer implemented process 200 for one aspect of process 100, namely initiating a replacement rental vehicle reservation as shown in FIG. 1. More specifically, process 200 shows the steps that occur after a policyholder satisfies 110 the pre-eligibility check (shown in FIG. 1), and the customized link has been generated. Process 200 may be implemented by a computing device, for example rental self-service ("RSS") computing device 310 (shown in FIG. 3). In the exemplary embodiment, RSS computing device 310 may be in communication with a user computer device 305 (shown in FIG. 3), such as a mobile computer device, an insurance network 325 (shown in FIG. 3), and one or more rental vendors 330 (shown in FIG. 3).

In the exemplary embodiment, process 200 may include retrieving 205 from an insurance provider database, policyholder insurance data using a claim identifier and a policyholder identifier. The insurance provider database may be associated with an insurance provider providing the automobile insurance policy to the policyholder. The policyholder insurance data may be stored in a database associated with RSS computing device 310 such as database 320 (shown in FIG. 3). The claim identifier may be associated with an initial loss claim submission (e.g., first notice of loss) filed by the policyholder (step 105, shown in FIG. 1). The claim identifier may be a claim number generated by the RSS computing device 310 or another insurance network 325 computing device when the policyholder reports 105 the claim (shown in FIG. 1) by filing a first notice of loss (e.g., FNOL). The policyholder identifier may be a policy number associated with the policyholder. The policyholder identifier and the claim identifier may be used to retrieve the policyholder's automobile insurance policy as of the date and time the claim identifier is generated. RSS computing device 310 may read the claim identifier and policyholder identifier parameters from the customized link already generated to retrieve policyholder insurance data associated with the claim and policyholder identifiers. The customized link is generated by RSS computing device 310 or another insurance network 325 computing device, and transmitted to the policyholder after the policyholder passes 110 the pre-eligibility check (FIG. 1).

Process 200 may also include verifying 210 that the policyholder is eligible to receive an insurance replacement rental by performing an eligibility check (FIG. 1). The eligibility check may be performed using the claim identifier and the policyholder identifier. As mentioned above, the claim identifier and policyholder identifier may be extracted from a customized link sent to the policyholder after passing 110 the pre-eligibility check (FIG. 1). The claim identifier and policyholder identifier may be used to retrieve policyholder insurance data, such as information associated with (i) the initial loss claim submission and (ii) the policyholder who reported 105 the loss (FIG. 1). The eligibility check may include applying eligibility rules stored in the memory to determine policyholder eligibility. Additionally or alternatively, the eligibility check may include determining if a pay code (e.g., cause of loss) for the initial loss claim submission has been generated and stored within the memory (e.g., cause of loss is open). RSS computing device 310 may communicate with an accounting system of the insurer to check that a pay code associated with rental vehicles exists for the reported 105 loss (FIG. 1).

In some embodiments, if the pay code does not exist (e.g., is not open), RSS computing device 310 may systematically open a rental pay code for the reported 105 loss, and query the accounting system of the insurer. In these embodiments, RSS computing device 310 may receive a response from the accounting system approving the systematically opened pay code. Based on the received response, RSS computing device 310 may determine that the policyholder remains eligible, and complete the verification process. In further embodiments, RSS computing device 310 may perform the eligibility check by applying a set of eligibility rules to the information provided in the first notice of loss (e.g., initial loss claim submission). In these embodiments, RSS computing device 310 may apply the set of eligibility rules in addition to determining that a rental pay code associated with the first notice of loss exists. The eligibility rules may be the same or similar to the rules applied in the pre-eligibility check.

In addition, process 200 may further include causing 215 to be displayed on a user device associated with the policyholder, a searchable interface configured to enable the policyholder to search for at least one rental vendor location applicable to the policyholder. The searchable interface may be prepopulated with at least some of the policyholder insurance data, and linked to a subset of rental vehicle data stored within the memory. The subset of rental vehicle data may be based on the policyholder's particular geographical location, zip code, and/or address (e.g., repair facility address, policyholder home address). The subset of rental vehicle data may include data as to rental vendors partnered with the policyholder's insurance provider (e.g., vendor locations, addresses, business hours, and phone numbers). The subset of rental vehicle data may also include a subset of vehicle classes available for rent by the rental vendors partnered with the policyholder's insurance provider. The subset of rental vehicle data may further include information specific to a rental vendor location such as rental quotes, available add-on features and services, rental delivery/pick-up data, and inventory data (e.g., available vehicle classes, vehicle model and make). The searchable interface may enable the policyholder to search for rental vendor locations of a selected rental vendor. In some embodiments, the searchable interface may enable the policyholder to search for rental vendors partnered with the policyholder's insurer. In other embodiments, a rental vendor may be designated for the policyholder's particular geographical location. The searchable interface may provide filtering features that enable the policyholder to search for rental vendor locations based on a zip code and/or address. Process 200 may further include receiving 220, from the policyholder, a selected vehicle class available inputted by the policyholder via a user device of the policyholder. The selected vehicle class may be available for rent at a selected rental vendor location. Subsequent to receiving a selected rental vendor location from the policyholder, RSS computing device 310 may enable the policyholder to select a vehicle class (e.g., sedan, van, truck, minivan). In some embodiments, RSS computing device 310 may enable the policyholder to select a vehicle make and model. In further embodiments, RSS computing device 310 may provide information as to available rental vehicles at the selected rental vendor location. The available rental vehicle information provided to the policyholder may be based on a selected vehicle class. In other embodiments, RSS computing device 310 may provide limited information on rental vehicle availability at the selected vendor location. In these embodiments, RSS computing device 310 may provide contact information (e.g., phone number, email) of the selected vendor location, and instruct the policyholder to directly inquire the selected vendor location as to availabilities. Additionally or alternatively, RSS computing device 310 may prompt the selected vendor location to contact the policyholder and provide direct information as to rental vehicle availability.

Process 200 may also include calculating 225 a policyholder cost to the policyholder for the selected vehicle class. The policyholder cost may be based upon the policyholder insurance data, the selected vehicle class, and the rental vehicle data for a selected rental vendor. The policyholder cost may be based upon a comparison of a quoted rental cost by the selected rental vendor, and coverage provisions of the policyholder's automobile insurance policy. Subsequent to receiving a selected vehicle class, RSS computing device 310 may query the selected vendor location of the selected rental vendor, requesting a rental quote for the selected vehicle class. In some embodiments, RSS computing device 310 may query the selected vendor location and/or the selected rental vendor through API calls. RSS computing device 310 may receive and display the rental quote to the policyholder. The rental quote may be provided to the policyholder as a daily rental quote. RSS computing device 310 may additionally compare the received rental quote to the policyholder's benefits under their automobile insurance policy, and calculate the policyholder cost.

Process 200 may also include displaying 230 to the policyholder a cost summary including the policyholder cost and information as to the calculation of the policyholder cost. The policyholder cost may be based on factors such as the policyholder's daily coverage limit, the rental quote received from the selected vendor location, the policyholder's rental period (e.g., hourly, daily, weekly, monthly), fees associated with the rental vendor (e.g., delivery fee), and additional add-on items the policyholder has selected. The cost summary may include a list of the estimated daily charges such as a daily rental cost quoted by the selected vendor location, taxes and fees, out-of-pocket expenses, and the daily coverage limit under the policyholder's insurance policy. RSS computing device 310 may also indicate whether or not the selected vehicle class is covered under the policyholder's insurance policy, and provide recommendations based on at least the policyholder's insurance coverage.

In some embodiments, policyholder may not select a vehicle class. In these embodiments, RSS computing device 310 may query the selected rental vendor location, requesting a daily rental quote for some or all of their available vehicle classes. RSS computing device 310 may receive this information from the selected rental vendor location, and display, to the policyholder, daily rental quotes for a range of vehicle classes. In this embodiment, RSS computing device 310 may compare the daily rental quote provided for each of the vehicle classes to the policyholder's insurance coverage. RSS computing device 310 may use the comparisons to calculate a policyholder cost for each of the vehicle classes it has a daily rental quote for. RSS computing device 310 may provide to the policyholder a cost summary of the calculations for each of the vehicle classes to assist in selecting a rental vehicle.

Process 200 may also include receiving 235, from the policyholder, confirmation of a rental reservation request of the selected vehicle class at the selected rental vendor location. In some embodiments, the policyholder may not have selected a vehicle class. In these embodiments, RSS computing device 310 may receive 235, from the policyholder, a confirmation of a rental reservation request at the selected rental vendor location. Subsequent to receiving 235 confirmation from the policyholder, RSS computing device 310 may transmit the rental reservation request and policyholder information to the selected rental vendor location. The transmitted rental reservation request may include information such as, but not limited to, a selected vehicle class, a method of retrieving the rental vehicle (e.g., vehicle pick-up or vehicle delivery), scheduling information (e.g., date, time, and location of vehicle pick-up or vehicle delivery), and the length of time the rental is needed for. The transmitted policyholder information may include information such as, but not limited to, the policyholder's policy number, the policyholder's insurance coverage (e.g., rental coverage), the claim identifier associated with the initial loss claim (e.g., first notice of loss), and a designated repair facility. Subsequent to receiving 235 confirmation, RSS computing device 310 may provide the policyholder a confirmation number and instruct the policyholder to wait for the selected rental vendor location to contact the policyholder.

Exemplary Computer Network

Figure 3:
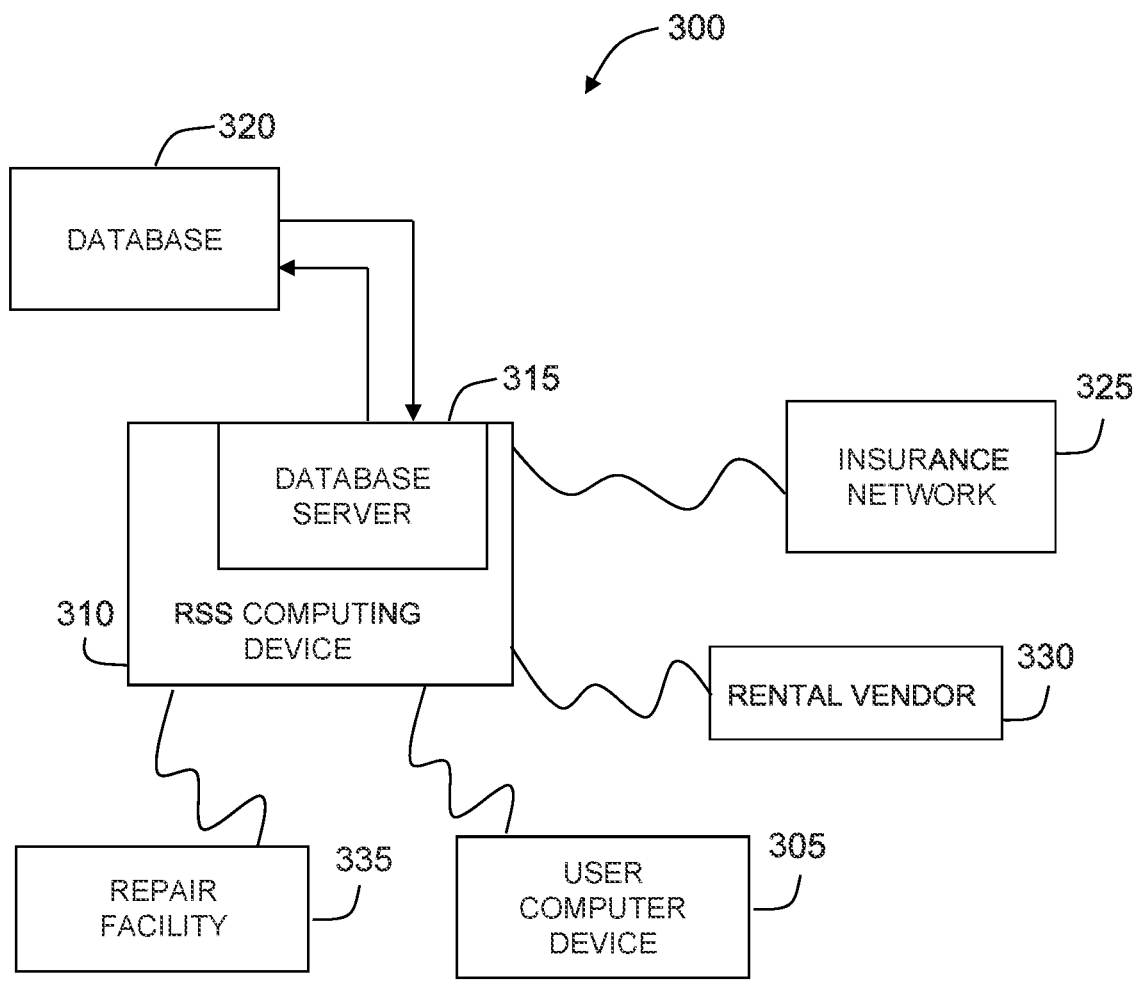
FIG. 3 illustrates a simplified block diagram of an exemplary computer system for implementing the process shown in FIG. 1.

FIG. 3 depicts a simplified block diagram of an exemplary computer system 300 for implementing process 100 shown in FIG. 1. In the exemplary embodiment, computer system 300 may be used for enabling a policyholder of an automobile insurance policy to initiate an insurance replacement rental reservation. As described below in more detail, a rental self-service ("RSS") computing device 310 may be configured to (i) retrieve, from an insurance provider database, policyholder insurance data using a claim identifier associated with an initial loss claim submission, and a policyholder identifier associated with the policyholder, the insurance provider database associated with an insurance provider providing the automobile insurance policy to the policyholder; (ii) verify that the policyholder is eligible to receive an insurance replacement rental by performing an eligibility check using the claim identifier and the policyholder identifier, wherein the eligibility check includes applying eligibility rules stored in the memory to determine policyholder eligibility; (iii) cause to be displayed on a user device associated with the policyholder a searchable interface that is prepopulated with at least some of the policyholder insurance data and linked to a subset of rental vehicle data stored within the memory, the searchable interface configured to enable the policyholder to search for at least one rental vendor location of at least one rental vendor applicable to the policyholder; (iv) receive a selected vehicle class inputted by the policyholder via the user device, wherein the selected vehicle class is available for rent at the at least one rental vendor location; (v) calculate, a policyholder cost for the selected vehicle class based upon the policyholder insurance data, the selected vehicle class, and the rental vehicle data for the at least one rental vendor; (vi) display, to the policyholder, a cost summary including the policyholder cost and information as to the calculation of the policyholder cost; and/or (vii) receive, from the policyholder, confirmation of a rental reservation request of the selected vehicle class at the at least one rental vendor location.

In the exemplary embodiment, user computer devices 305 are computers that include a web browser or a software application, which enables user computer devices 305 to access remote computer devices, such as RSS computing device 310 and insurance network computer devices 325, using the Internet or other network. More specifically, user computer devices 305 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. User computer devices 305 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices.

A database server 315 may be communicatively coupled to a database 320 that stores data. In one embodiment, database 320 may include the eligibility rules, daily cost estimates, rental reservation request, rental vendor information, and repair facility information. In the exemplary embodiment, database 320 may be stored remotely from RSS computing device 310. In some embodiments, database 320 may be decentralized. In the exemplary embodiment, the policyholder may access database 320 via user computer device 305 by logging onto RSS computing device 310, as described herein.

RSS computing device 310 may be communicatively coupled with one or more user computer devices 305. In some embodiments, RSS computing device 310 may be associated with, or is part of a computer network associated with an insurance provider, or in communication with insurance network computer devices 325. In other embodiments, RSS computing device 310 may be associated with a third party and is merely in communication with the insurance network computer devices 325. More specifically, RSS computing device 310 is communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem.

RSS computing device 310 may perform all of the steps of process 100 shown in FIG. 1. In some embodiments, insurance network computer devices 325 may be configured to receive an initial loss claim submission (e.g., policyholder reports 105 loss) and/or determine whether a policyholder passes 110 a pre-eligibility check (both shown in FIG. 1). In these embodiments, insurance network computer devices 325 may be communicatively coupled with RSS computing device 310 to provide claim information and pre-eligibility check information to RSS computing device 310.

RSS computing device 310 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In the exemplary embodiment, RSS computing device 310 hosts an application or website that allows the policyholder to access the functionality described herein. In some further embodiments, user computer device 305 includes an application that facilitates communication with RSS computing device 310. RSS computing device 310 is capable of communicating with insurance network computer devices 325, rental vendor computer devices 330, and repair facility computer devices 335 through an application programming interface (API). RSS computing device 310 may also use APIs to communicate with outside applications, such as, but not limited to, data sources about the damaged vehicle, data sources about driver information concerning the policyholder, access to law enforcement and/or state laws governing automobile insurance policies and rental vehicles, and other applications as necessary.

In the exemplary embodiment, insurance network computer devices 325 include one or more computer devices associated with an insurance provider. In the exemplary embodiment, insurance provider is associated with the policyholder and the policyholder has an automobile insurance policy that insures his or her vehicle with insurance provider. In the exemplary embodiment, insurance network computer devices 325 include a web browser or a software application, which enables insurance network computer devices 325 to access remote computer devices, such as RSS computing device 310 and database server 315, using the Internet or other network. More specifically, insurance network computer devices 325 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Insurance network computer devices 325 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, insurance network computer devices 325 may access database 320 to update eligibility rules, review daily rental estimates, and/or review rental reservation requests.

In the exemplary embodiment, rental vendor computer devices 330 include computer devices associated with rental vendors capable of providing rental vehicles. More specifically, rental vendor computer devices 330 may provide rental vendor information such as available locations (e.g., branches) of a rental vendor. In the exemplary embodiment, rental vendor computer devices 330 include a web browser or a software application, which enables rental vendor computer devices 330 to access remote computer devices, such as RSS computing device 310, using the Internet or other network. More specifically, rental vendor computer devices 330 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Rental vendor computer devices 330 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. Rental vendor computer devices 330 may also include computer devices associated with a selected rental vendor and a selected rental vendor location. Rental vendor computing devices 330 may communicate with RSS computing device 310 during the rental reservation process and provide information such as rental quotes (e.g., hourly, daily, weekly, and/or monthly rental quotes) for vehicle classes, and available vehicle classes for rent. Rental vendor computer devices 330 may communicate with database 320 to retrieve information about the policyholder, information about the loss report, and information related to the rental reservation request.

In the exemplary embodiment, repair facility computer devices 333 include computer devices associated with repair facilities capable of repairing object. In the exemplary embodiment, repair facility computer devices 335 include a web browser or a software application, which enables repair facility computer devices 335 to access remote computer devices, such as RSS computing device 310, using the Internet or other network. More specifically, repair facility computer devices 335 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Repair facility computer devices 335 may be any device capable of accessing the Internet including, but not limited to, a desktop computer, a laptop computer, a personal digital assistant (PDA), a cellular phone, a smartphone, a tablet, a phablet, wearable electronics, smart watch, or other web-based connectable equipment or mobile devices. In some embodiments, repair facility computer devices 335 may communicate with RSS computing device 310 to schedule delivery of the rental vehicle to the repair facility. Repair facility computer devices 335 may provide RSS computing device 310 with scheduling information such as the date and time repairs will begin. In other embodiments, repair facility computer devices 335 may communicate with database 320 to retrieve information about the loss report. In these embodiments, the policyholder plans to have his or her vehicle repaired at a designated (e.g., selected) repair facility.

Exemplary Client Device

Figure 4:
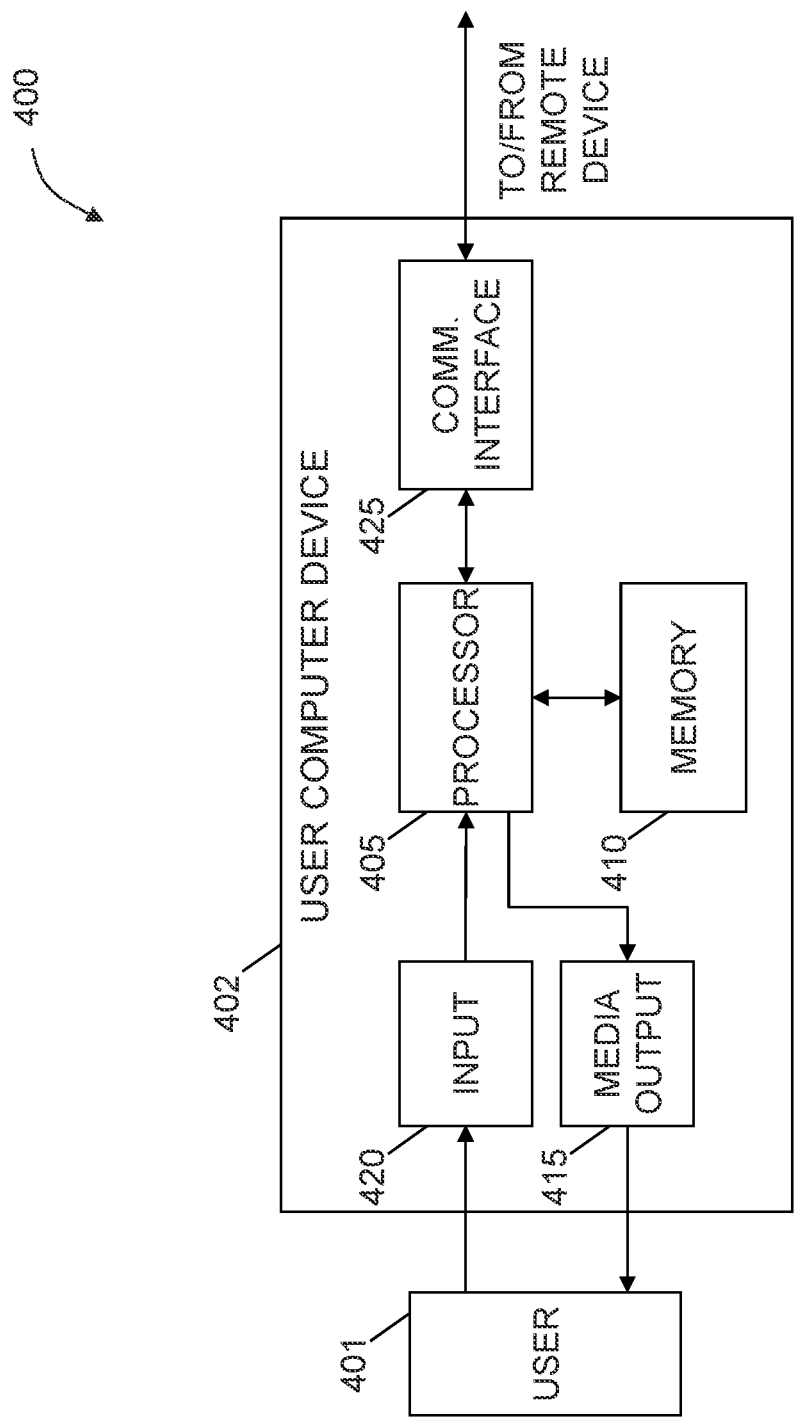
FIG. 4 illustrates an exemplary configuration of a user computer device, in accordance with one aspect of the present disclosure.

FIG. 4 depicts an exemplary configuration 400 of user computer device 402, in accordance with one embodiment of the present disclosure. In the exemplary embodiment, user computer device 402 may be similar to, or the same as, user computer device 305 (shown in FIG. 3). User computer device 402 may be operated by a user 401. User computer device 402 may include, but is not limited to, user computer devices 305, insurance network computer devices 325, rental vendor computer devices 330, and repair facility computer devices 335 (all shown in FIG. 3). User computer device 402 may include a processor 405 for executing instructions. In some embodiments, executable instructions may be stored in a memory area 410. Processor 405 may include one or more processing units (e.g., in a multi-core configuration). Memory area 410 may be any device allowing information such as executable instructions and/or transaction data to be stored and retrieved. Memory area 410 may include one or more computer readable media.

User computer device 402 may also include at least one media output component 415 for presenting information to user 401. Media output component 415 may be any component capable of conveying information to user 401. In some embodiments, media output component 415 may include an output adapter (not shown) such as a video adapter and/or an audio adapter. An output adapter may be operatively coupled to processor 405 and operatively coupleable to an output device such as a display device (e.g., a cathode ray tube (CRT), liquid crystal display (LCD), light emitting diode (LED) display, or "electronic ink" display) or an audio output device (e.g., a speaker or headphones).

In some embodiments, media output component 415 may be configured to present a graphical user interface (e.g., a web browser and/or a client application) to user 401. A graphical user interface may include, for example, an interface for viewing rental vendor search results, selected rental vendor location information, daily estimate costs, and other rental reservation information. In some embodiments, user computer device 402 may include an input device 420 for receiving input from user 401. User 401 may use input device 420 to, without limitation, select and/or enter one or more items of information about rental vendor location, vehicle class, and/or rental delivery preferences.

Input device 420 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 415 and input device 420.

User computer device 402 may also include a communication interface 425, communicatively coupled to a remote device such as RSS computing device 310 (shown in FIG. 3). Communication interface 425 may include, for example, a wired or wireless network adapter and/or a wireless data transceiver for use with a mobile telecommunications network.

Stored in memory area 410 are, for example, computer readable instructions for providing a user interface to user 401 via media output component 415 and, optionally, receiving and processing input from input device 420. A user interface may include, among other possibilities, a web browser and/or a client application. Web browsers enable users, such as user 401, to display and interact with media and other information typically embedded on a web page or a website from RSS computing device 310. A client application may allow user 401 to interact with, for example, RSS computing device 310. For example, instructions may be stored by a cloud service, and the output of the execution of the instructions sent to the media output component 415.

Exemplary Server Device

Figure 5:
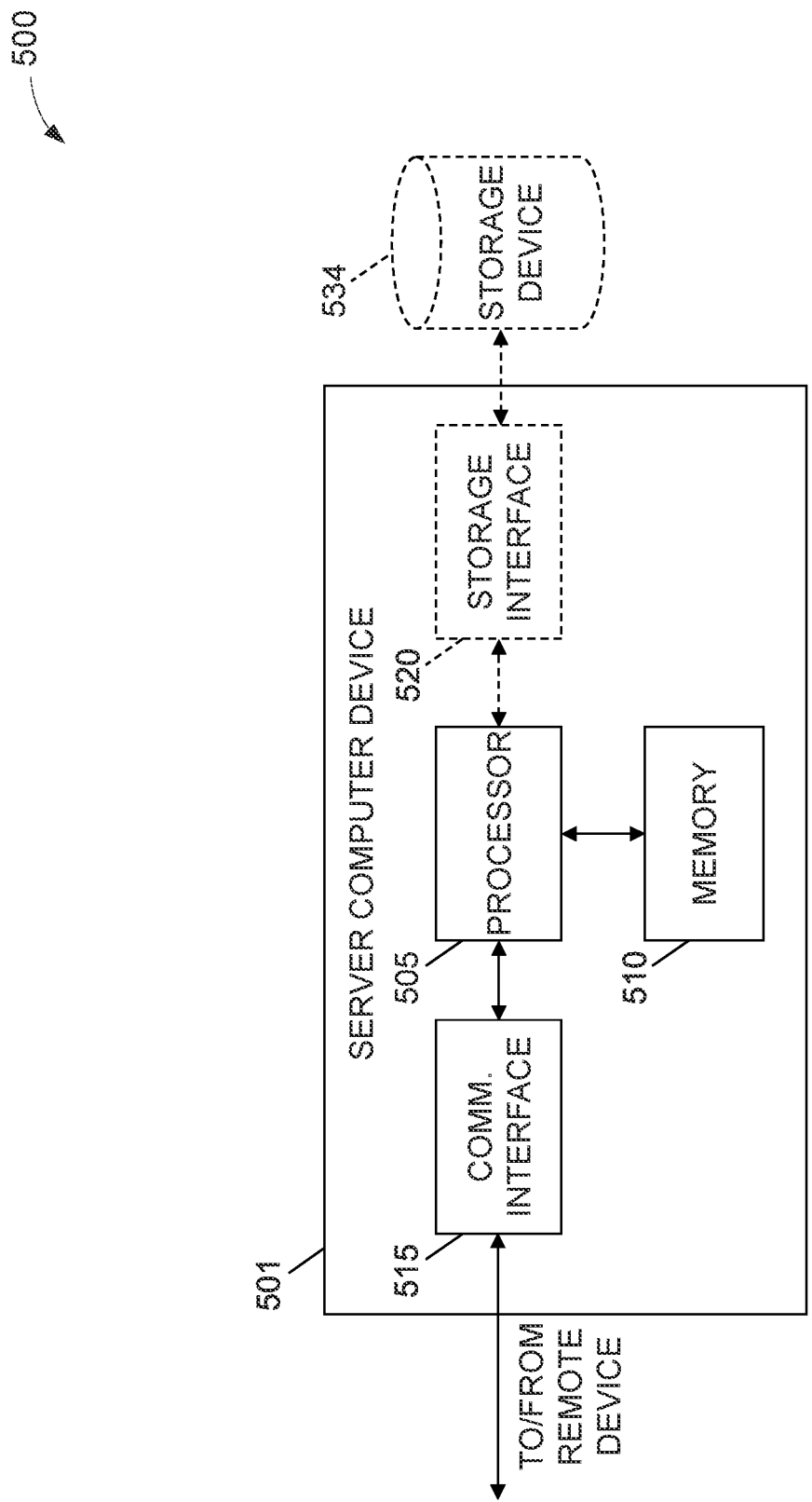
FIG. 5 illustrates an exemplary configuration of a server computer device, in accordance with one aspect of the present disclosure.

FIG. 5 depicts an exemplary configuration 500 of a server computer device 501, in accordance with one embodiment of the present disclosure. In the exemplary embodiment, server computer device 501 may be similar to, or the same as, RSS computing device 310 (shown in FIG. 3). Server computer device 501 may include, but is not limited to, RSS computing device 310, insurance network computer devices 325, rental vendor computer device 330, repair facility computer device 335, and database server 315 (all shown in FIG. 3). Server computer device 501 may also include a processor 505 for executing instructions. Instructions may be stored in a memory area 510. Processor 505 may include one or more processing units (e.g., in a multi-core configuration).

Processor 505 may be operatively coupled to a communication interface 515 such that server computer device 501 is capable of communicating with a remote device such as another server computer device 501, RSS computing device 310, insurance network computer devices 325, rental vendor computer device 330, repair facility computer device 335, and user computer devices 305 (all shown in FIG. 3) (for example, using wireless communication or data transmission over one or more radio links or digital communication channels). For example, communication interface 515 may receive requests from user computer devices 305 via the Internet, as illustrated in FIG. 3.

Processor 505 may also be operatively coupled to a storage device 534. Storage device 534 may be any computer-operated hardware suitable for storing and/or retrieving data, such as, but not limited to, data associated with database 320 (shown in FIG. 3). In some embodiments, storage device 534 may be integrated in server computer device 501. For example, server computer device 501 may include one or more hard disk drives as storage device 534.

In other embodiments, storage device 534 may be external to server computer device 501 and may be accessed by a plurality of server computer devices 501. For example, storage device 534 may include a storage area network (SAN), a network attached storage (NAS) system, and/or multiple storage units such as hard disks and/or solid state disks in a redundant array of inexpensive disks (RAID) configuration.

In some embodiments, processor 505 may be operatively coupled to storage device 534 via a storage interface 520. Storage interface 520 may be any component capable of providing processor 505 with access to storage device 534. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 534.

Processor 505 may execute computer-executable instructions for implementing aspects of the disclosure. In some embodiments, the processor 505 may be transformed into a special purpose microprocessor by executing computer-executable instructions or by otherwise being programmed. For example, the processor 505 may be programmed with the instruction such as illustrated in FIG. 2.

Exemplary Computer Device

Figure 6:
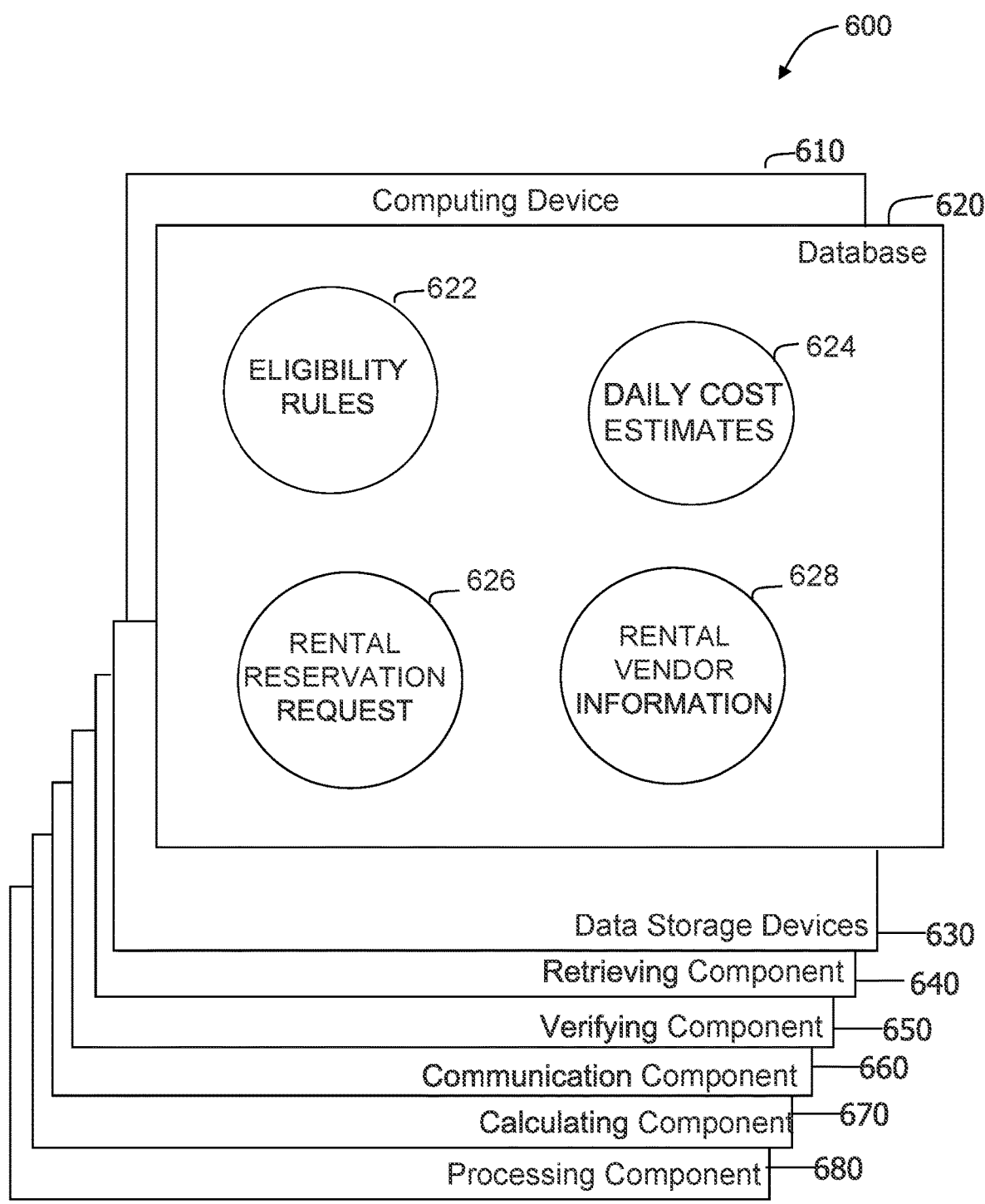
FIG. 6 illustrates a diagram of components of one or more exemplary computing devices that may be used in the system shown in FIG. 4.

FIG. 6 depicts a diagram 600 of components of one or more exemplary computing devices 610 that may be used in system 300 shown in FIG. 3. In some embodiments, computing device 610 may be similar to RSS computing device 310. Database 620 may be coupled with several separate components within computing device 610, which perform specific tasks. In this embodiment, database 620 may include the eligibility rules 622, daily cost estimates 624, rental reservation request 626, and rental vendor information 628. In some embodiments, database 620 is similar to database 320 (shown in FIG. 3).

Computing device 610 may include the database 620, as well as data storage devices 630. Computing device 610 may also include a retrieving component 640 for retrieving 205 policyholder insurance data from an insurance provider database using a claim identifier and a policyholder identifier (shown in FIG. 2). Computing device 610 may also include a verifying component 650 for verifying 210 that the policyholder is eligible to receive an insurance replacement rental by performing an eligibility check using the claim identifier and the policyholder identifier (shown in FIG. 2). Computing device 610 may further include a communication component 660 for causing 215 to be displayed on a user device associated with the policyholder a searchable interface configured to enable the policyholder to search for at least one rental vendor location, receiving 220 a selected vehicle class inputted by the policyholder, displaying 230 a cost summary including the policyholder cost and information as to the calculation of the policyholder cost, and receiving 235 a confirmation of a rental reservation request from the policyholder (all shown in FIG. 2). Moreover, computing device 610 may include a calculating component 670 for calculating 225 a policyholder cost for a selected vehicle class (shown in FIG. 2). A processing component 680 may assist with execution of computer-executable instructions associated with the system.

Exemplary User Interface

Figure 7A:
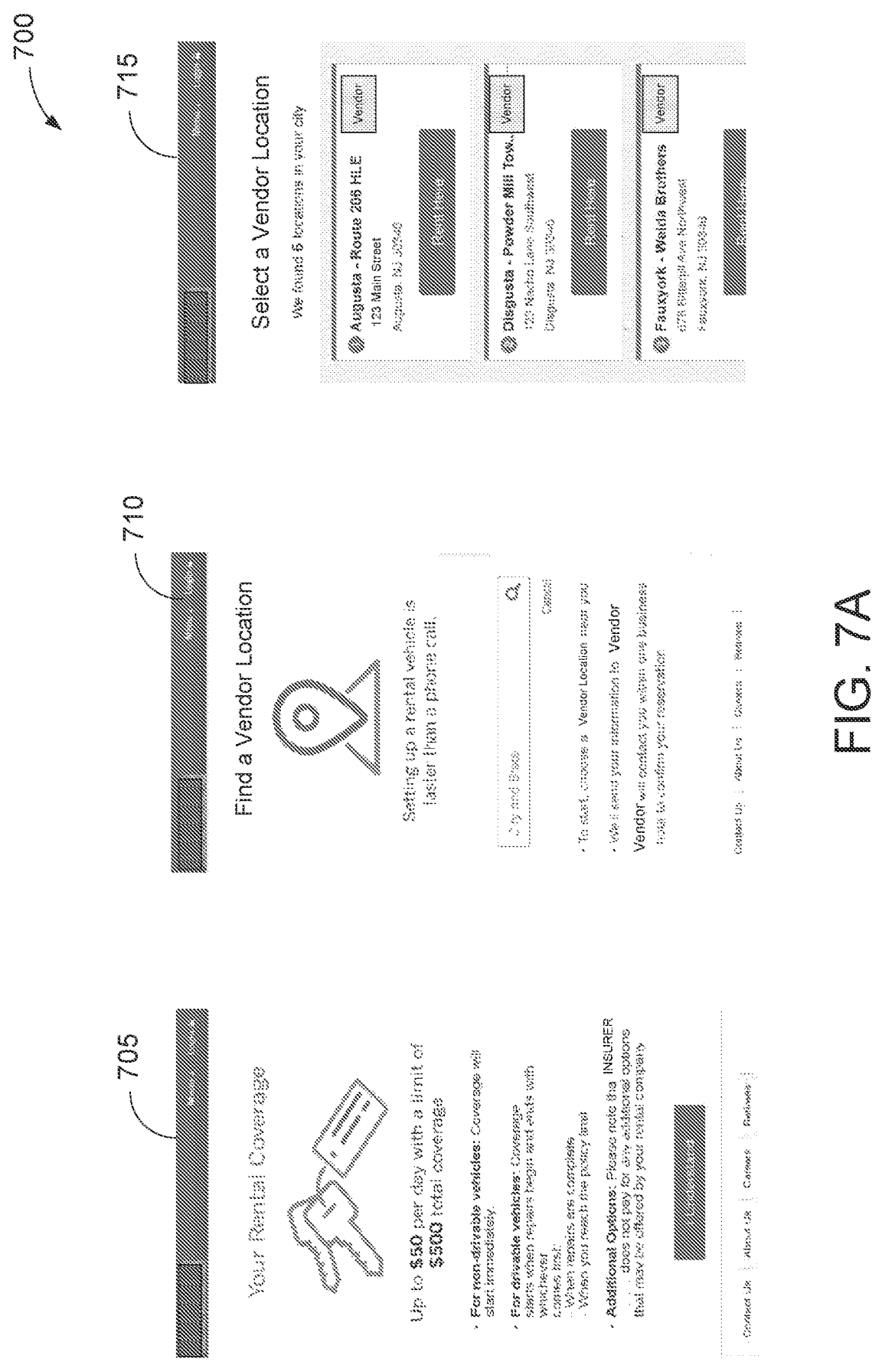
Figure 7B:
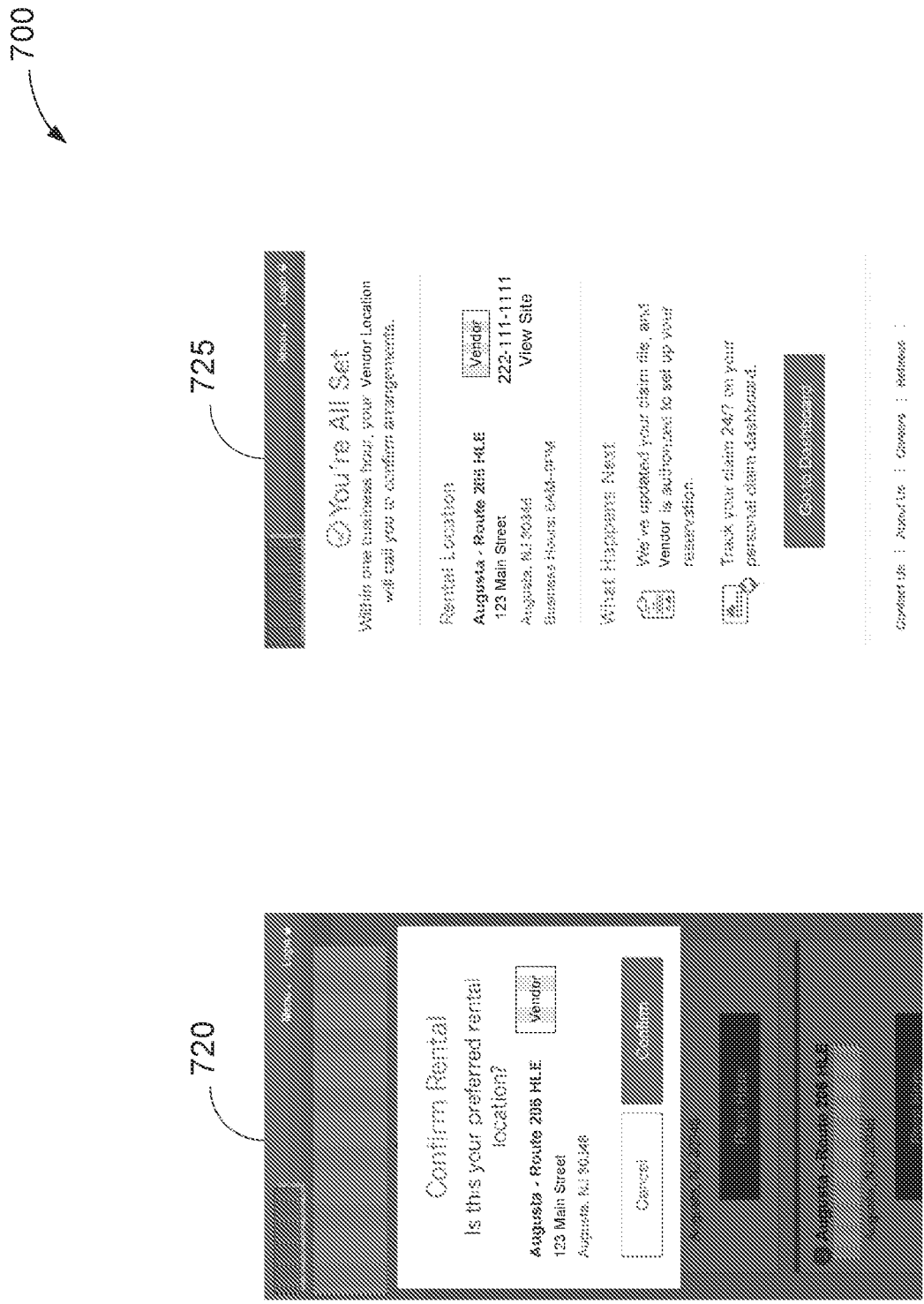

FIGS. 7A and 7B illustrate a plurality of views or screenshots of a user interface 700 for initiating a rental vehicle reservation using system 300 (shown in FIG. 3). In the exemplary embodiment, user interface 700 is displayed on user computer device 305 (shown in FIG. 3).

A first view 705 (e.g., rental coverage view) of user interface 700 contains the insurance coverage provisions of the policyholder. As shown in first view 705, an explanation of the policyholder's rental coverage is provided to the policyholder. In this embodiment, first view 705 displays the daily rental coverage amount and the total rental coverage amount. In this view, a brief explanation of when coverage may start is provided for non-drivable vehicles and for drivable vehicles. In this embodiment, first view 705 notifies the policyholder that additional options offered by the rental vendor are not part of the rental coverage (e.g., out-of-pocket expenses). In the exemplary embodiment, the policyholder presses a confirmation button such as an "I understand" button after reviewing his or her coverages. By pressing the confirmation button, the policyholder indicates that he or she remains interested in placing a rental vehicle reservation request.

A second view 710 (e.g., find a vendor view) illustrates what occurs after the policyholder presses the confirmation button to begin the process. Specifically, second view 710 illustrates what occurs after the policyholder passes 125 the eligibility check (shown in FIG. 1). As shown in second view 710, the policyholder may search for vendor locations. In some embodiments, second view 710 may instruct the policyholder to select a vendor before searching for vendor locations. In these embodiments, second view 710 may provide a list of rental vendors that are partnered with the policyholder's insurer. In certain embodiments, second view 710 may enable the policyholder to search for and select a specific rental vendor. In the exemplary embodiment, second view 710 provides a search interface that enables the policyholder to search by city and state. In further embodiments, the search interface may automatically populate the policyholder's city and state. In the exemplary embodiment, second view 710 provides, to the policyholder, an explanation of what to expect after selecting a rental vendor location. Second view 710 notifies the policyholder that after choosing a vendor location, the policyholder's information is sent to the vendor. Second view 710 further explains to the policyholder that the rental vendor (e.g., rental vendor location) will contact the policyholder to confirm the rental vehicle reservation.

A third view 715 (e.g., select a vendor location view) illustrates what occurs after the policyholder searches for a vendor location based on city and state. The policyholder may also search for vendor locations by inputting a specific address, such as a repair facility address. Third view 715 provides search results of rental vendor locations within the policyholder's city. Third view 715 may provide the search results as a list, and may display the nearest rental vendor location (in reference to the inputted city and/or state) first and the farthest rental vendor location last. In some embodiments, third view 715 may display rental vendor locations near a designated repair facility without the policyholder having to input the repair facility address. In these embodiments, the policyholder may have provided repair facility information to RSS computing device 310 (shown in FIG. 3) in the initial claim loss submission (e.g., first notice of loss). In the exemplary embodiment, third view 715 provides a button, such as a "rent here" button, that allows the policyholder to select a displayed rental vendor location. As shown in third view 815, vendor location information such as business address may be provided to the policyholder.

A fourth view 720 (e.g., rental confirmation view) illustrates what occurs when the policyholder selects a rental vendor location. Specifically, fourth view 720 prompts the policyholder to confirm the selected rental location. Fourth view 720 provides the policyholder an option to cancel and confirm. In some embodiments, fourth view 720 may prompt the policyholder to confirm additional information such as a selected vehicle class, a vehicle delivery method (e.g., vehicle pick-up, vehicle delivery), and a corresponding date and time for vehicle delivery. In further embodiments, fourth view 720 may also provide a policyholder cost for a selected rental vehicle class. In these embodiments, fourth view 720 may prompt the policyholder to confirm that he or she understands the rental charges. For example, the policyholder may have selected a vehicle class and additional add-on items that have a policyholder cost that is over the daily coverage limit set by the policyholder's rental coverage. In these embodiments, fourth view 720 may explain the out-of-pocket expenses, and require the policyholder press a button confirming he or she understands.

A fifth view 725 (e.g., confirmed rental view) illustrates what occurs when the policyholder confirms the rental reservation request. Fourth view 725 provides the policyholder with information as to what the policyholder may expect next. Fourth view 725 displays contact information for the selected rental vendor location, such as an address, phone number, business hours, and a selected rental vendor website. In the exemplary embodiment, fourth view 725 notifies the policyholder that the selected rental vendor will receive the rental reservation request as well as policyholder information. Fourth view 725 may further notify the policyholder that his or her claim file may be updated to reflect the rental reservation request information. In the exemplary embodiment, fourth view 725 enables the policyholder to return to a user homepage, such as a dashboard.

Exemplary Embodiments & Functionality

In one aspect, a computer system for reserving a rental vehicle may be provided. The computer system may enable a policyholder of an automobile insurance policy to initiate an insurance replacement rental subsequent to an initial loss claim submission. The computer system may include a processor in communication with a memory. The processor may be configured or programmed to: (1) retrieve, from an insurance provider database, policyholder insurance data using a claim identifier associated with the initial loss claim submission, and a policyholder identifier associated with the policyholder, the insurance provider database associated with an insurance provider providing the automobile insurance policy to the policyholder; (2) verify that the policyholder is eligible to receive an insurance replacement rental by performing an eligibility check using the claim identifier and the policyholder identifier, wherein the eligibility check includes applying eligibility rules stored in the memory to determine policyholder eligibility; (3) cause to be displayed on a user device associated with the policyholder a searchable interface that is prepopulated with at least some of the policyholder insurance data and linked to a subset of rental vehicle data stored within the memory, the searchable interface configured to enable the policyholder to search for at least one rental vendor location of at least one rental vendor applicable to the policyholder; (4) receive a selected vehicle class inputted by the policyholder via the user device, wherein the selected vehicle class is available for rent at the at least one rental vendor location; (5) calculate, a policyholder cost for the selected vehicle class based upon the policyholder insurance data, the selected vehicle class, and the rental vehicle data for the at least one rental vendor; (6) display, to the policyholder, a cost summary including the policyholder cost and information as to the calculation of the policyholder cost; and/or (7) receive, from the policyholder, confirmation of a rental reservation request of the selected vehicle class at the at least one rental vendor location.

A further enhancement may be where the policyholder insurance data includes rental vehicle provisions of the automobile insurance policy as of the date and time the claim identifier is generated (e.g., first notice of loss filed).

A further enhancement may be where the computer system provides a delivery option to the policyholder. The delivery option may enable the policyholder to schedule either a vehicle pick-up at the at least one rental vendor location or a vehicle delivery, by the at least one rental vendor location, to the policyholder.

A further enhancement may be where the computer system verifies that the policyholder is eligible to receive an insurance replacement rental by determining that a pay code for the initial loss claim submission has been generated and stored within the memory. Another enhancement may be where the computer system transmits the rental reservation request to the at least one vendor location. The company system may also transmit at least some of the policyholder insurance data to the at least one vendor location.

A further embodiment may be where the computer system updates a claim file of the policyholder to include the rental reservation request. The claim file may contain information related to the initial loss claim submission. A further embodiment may be where the computer system generates a file note for a claims handler. The file note may include the rental reservation request. A still further embodiment may be where the computer system outputs a rental vehicle recommendation (e.g., best rental option) for the policyholder based on the calculation.

A further embodiment may be where the subset of rental vehicle data is based at least on a geolocation input by the policyholder. The subset of rental vehicle data may include at least one rental vendor applicable to the policyholder and a subset of vehicle classes available for rent by the at least one rental vendor. Another embodiment may be where the computer system (1) retrieves, repair facility information of at least one repair facility associated with the policyholder from an insurance provider database; and (2) displays, to the policyholder, available rental vendor locations near the at least one repair facility.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on a non-transitory computer-readable media or medium.

Additionally, the computer systems discussed herein may include additional, less, or alternate functionality, including that discussed elsewhere herein. The computer systems discussed herein may include or be implemented via computer-executable instructions stored on a non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as images, object statistics and information, historical estimates, and/or actual repair costs. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the object, vehicle, user, damage, needed repairs, costs and/or incident from vehicle data, insurance policies, geolocation data, image data, and/or other data.

Based upon these analyses, the processing element may learn how to identify characteristics and patterns that may then be applied to analyzing image data, model data, and/or other data. For example, the processing element may learn, with the user's permission or affirmative consent, to identify the type of incident that occurred based upon images of the resulting damage. The processing element may also learn how to identify damage that may not be readily visible based upon the received image data.

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:
1. A rental self-service ("RSS") computer system comprising a processor in communication with a memory, the processor programmed to:
  verify, in response to an initial loss claim filed by a policyholder, that the policyholder is eligible to receive an insurance replacement rental by performing an eligibility check using a claim identifier associated with the initial loss claim and a policyholder identifier associated with the policyholder;

in response to the policyholder being verified as eligible, generate a customized link including a representation of the claim identifier and the policyholder identifier;
transmit the customized link to a user device associated with the policyholder;
in response to selection of the customized link at the user device, receive, from the user device, an access request for access of a rental self-service portal, the access request identifying the customized link selected by the policyholder;
retrieve, from a database, using the representation of the claim identifier and the policyholder identifier extracted from the customized link identified in the access request, policyholder data;
pre-populate a portion of a searchable interface of the rental self-service portal using the retrieved policyholder data, for display on the user device;
in response to receiving rental vehicle search input into the searchable interface, retrieve, via a plurality of Application Interface Programming (API) calls to a respective plurality of vehicle rental vendor devices, rental vehicle data that satisfies the rental vehicle search input;
cause the rental vehicle data to be displayed on the user device to enable the policyholder to view available rental options and select a vehicle class available for rent;
calculate a policyholder cost for renting a selected vehicle class based upon the policyholder data and a corresponding vehicle rental quote for the selected vehicle class, the policyholder cost including a difference between a covered rental amount indicated in the retrieved policyholder data and a rental cost indicated in the vehicle rental quote; and
cause to be displayed on the user device (i) the calculated policyholder cost and (ii) an option to confirm the rental reservation.

2. The RSS computer system of claim 1, wherein to pre-populate the portion of the searchable interface, the processor is further programmed to retrieve and display, in one or more corresponding search input fields, rental coverage details associated with an insurance policy of the policyholder and a primary rental vendor at a geographical location associated with the policyholder.

3. The RSS computer system of claim 1, wherein the processor is further programmed to cause display of the pre-populated searchable interface on the user device, the pre-populated searchable interface including input fields for receiving rental vehicle search input from the policyholder including one or more of: a geographical location relative to a current location of the policyholder, a geographical location relative to a repair facility, the vehicle class, a vehicle make, a vehicle model, or a vehicle availability.

4. The RSS computer system of claim 1, wherein the processor is further programmed to, when the policyholder cost is greater than a threshold amount:
identify a non-selected vehicle class;
determine that selection of the non-selected vehicle class would reduce the policyholder cost below the threshold amount; and
cause to be displayed on the user device (iii) a recommendation that the user select the non-selected vehicle class to reduce the policyholder cost.

5. The RSS computer system of claim 1, wherein the processor is further programmed to:
retrieve, as part of the policyholder data, a location of a designated repair facility of the policyholder; and
upon confirmation of the rental reservation, initiate delivery of a vehicle in the selected vehicle class to the designated repair facility.

6. The RSS computer system of claim 1, wherein performing the eligibility check includes applying a plurality of eligibility rules to information in the initial loss claim.

7. The RSS computer system of claim 1, wherein the processor is further programmed to:
receive, from the user device, the initial loss claim via a software application executed on the user device; and
cause display of the searchable interface within a user interface of the same software application executed on the user device.

8. The RSS computer system of claim 1, wherein the processor is further programmed to transmit the rental reservation and at least some of the policyholder data to a selected vendor location.

9. A computer-implemented method for enabling a policyholder to initiate a replacement rental reservation after submission of an initial loss claim, the method implemented on a rental self-service ("RSS") computing device including at least one processor in communication with at least one memory device, the method comprising:
verifying, in response to an initial loss claim filed by a policyholder, that the policyholder is eligible to receive an insurance replacement rental by performing an eligibility check using a claim identifier associated with the initial loss claim and a policyholder identifier associated with the policyholder;
in response to the policyholder being verified as eligible, generating a customized link including a representation of the claim identifier and the policyholder identifier;
transmitting the customized link to a user device associated with the policyholder;
in response to selection of the customized link at the user device, receiving, from the user device, an access request for access of a rental self-service portal, the access request identifying the customized link selected by the policyholder;
retrieving, from a database, using the representation of the claim identifier and the policyholder identifier extracted from the customized link identified in the access request, policyholder data;
pre-populating a portion of a searchable interface of the rental self-service portal using the retrieved policyholder data, for display on the user device;
in response to receiving rental vehicle search input into the searchable interface, retrieving, via a plurality of Application Interface Programming (API) calls to a respective plurality of vehicle rental vendor devices, rental vehicle data that satisfies the rental vehicle search input;
causing the rental vehicle data to be displayed on the user device to enable the policyholder to view available rental options and select a vehicle class available for rent;
calculating a policyholder cost for renting a selected vehicle class based upon the policyholder data and a corresponding vehicle rental quote for the selected vehicle class, the policyholder cost including a difference between a covered rental amount indicated in the retrieved policyholder data and a rental cost indicated in the vehicle rental quote; and
causing to be displayed on the user device (i) the calculated policyholder cost and (ii) an option to confirm the rental reservation.

10. The method of claim 9, wherein pre-populating the portion of the searchable interface comprises retrieving and displaying, in one or more corresponding search input fields, rental coverage details associated with an insurance policy of the policyholder and a primary rental vendor at a geographical location associated with the policyholder.

11. The method of claim 9, further comprising causing display of the pre-populated searchable interface on the user device, the pre-populated searchable interface including input fields for receiving rental vehicle search input from the policyholder including one or more of: a geographical location relative to a current location of the policyholder, a geographical location relative to a repair facility, the vehicle class, a vehicle make, a vehicle model, or a vehicle availability.

12. The method of claim 9, further comprising, when the policyholder cost is greater than a threshold amount:
identifying a non-selected vehicle class;
determining that selection of the non-selected vehicle class would reduce the policyholder cost below the threshold amount; and
causing to be displayed on the user device (iii) a recommendation that the user select the non-selected vehicle class to reduce the policyholder cost.

13. The method of claim 9, further comprising:
retrieving, as part of the policyholder data, a location of a designated repair facility of the policyholder; and
upon confirmation of the rental reservation, initiating delivery of a vehicle in the selected vehicle class to the designated repair facility.

14. The method of claim 9, wherein performing the eligibility check comprising applying a plurality of eligibility rules to information in the initial loss claim.

15. The method of claim 9, further comprising:
receiving, from the user device, the initial loss claim via a software application executed on the user device; and
causing display of the searchable interface within a user interface of the same software application executed on the user device.

16. The method of claim 9, further comprising transmitting the rental reservation and at least some of the policyholder data to a selected vendor location.

17. A non-transitory computer-readable storage media having computer-executable instructions embodied thereon for enabling a policyholder to initiate a replacement rental reservation, wherein when executed by at least one processor of an RSS computing device, the computer-executable instructions cause the at least one processor to:
verify, in response to an initial loss claim filed by a policyholder, that the policyholder is eligible to receive an insurance replacement rental by performing an eligibility check using a claim identifier associated with the initial loss claim and a policyholder identifier associated with the policyholder;
in response to the policyholder being verified as eligible, generate a customized link including a representation of the claim identifier and the policyholder identifier;
transmit the customized link to a user device associated with the policyholder;
in response to selection of the customized link at the user device, receive, from the user device, an access request for access of a rental self-service portal, the access request identifying the customized link selected by the policyholder;
retrieve, from a database, using the representation of the claim identifier and the policyholder identifier extracted from the customized link identified in the access request, policyholder data;
pre-populate a portion of a searchable interface of the rental self-service portal using the retrieved policyholder data, for display on the user device;
in response to receiving rental vehicle search input into the searchable interface, retrieve, via a plurality of Application Interface Programming (API) calls to a respective plurality of vehicle rental vendor devices, rental vehicle data that satisfies the rental vehicle search input;
cause the rental vehicle data to be displayed on the user device to enable the policyholder to view available rental options and select a vehicle class available for rent;
calculate a policyholder cost for renting a selected vehicle class based upon the policyholder data and a corresponding vehicle rental quote for the selected vehicle class, the policyholder cost including a difference between a covered rental amount indicated in the retrieved policyholder data and a rental cost indicated in the vehicle rental quote; and
cause to be displayed on the user device (i) the calculated policyholder cost and (ii) an option to confirm the rental reservation.

18. The non-transitory computer-readable storage media of claim 17, wherein the computer-executable instructions further cause the at least one processor to, when the policyholder cost is greater than a threshold amount:
identify a non-selected vehicle class;
determine that selection of the non-selected vehicle class would reduce the policyholder cost below the threshold amount; and
cause to be displayed on the user device (iii) a recommendation that the user select the non-selected vehicle class to reduce the policyholder cost.

\* \* \* \* \*